United States Patent
Chen et al.

(10) Patent No.: US 10,453,171 B2
(45) Date of Patent: Oct. 22, 2019

(54) MULTIPLE STAGE MEMORY LOADING FOR A THREE-DIMENSIONAL LOOK UP TABLE USED FOR GAMUT MAPPING

(71) Applicant: ATI TECHNOLOGIES ULC, Markham (CA)

(72) Inventors: Yuxin Chen, Markham (CA); Chun-Chin Yeh, Markham (CA)

(73) Assignee: ATI Technologies ULC, Markham (CA)

( * ) Notice: Subject to any disclaimer, the term of this patent is extended or adjusted under 35 U.S.C. 154(b) by 109 days.

(21) Appl. No.: 15/469,299

(22) Filed: Mar. 24, 2017

(65) Prior Publication Data

US 2018/0276787 A1  Sep. 27, 2018

(51) Int. Cl.
- *G06T 1/60* (2006.01)
- *G09G 5/06* (2006.01)
- *G06F 12/02* (2006.01)

(52) U.S. Cl.
CPC .......... *G06T 1/60* (2013.01); *G06F 12/0207* (2013.01); *G06F 12/0292* (2013.01); *G09G 5/06* (2013.01); *G06F 2212/1024* (2013.01); *G09G 2340/06* (2013.01)

(58) Field of Classification Search
None
See application file for complete search history.

(56) References Cited

U.S. PATENT DOCUMENTS

| | | |
|---|---|---|
| 5,943,058 A | 8/1999 | Nagy |
| 7,701,465 B2 | 4/2010 | Suzuki et al. |
| 2004/0215870 A1* | 10/2004 | Chow .................. G11C 15/00 711/108 |
| 2004/0246268 A1* | 12/2004 | Nair .................... G09G 5/02 345/601 |
| 2008/0068861 A1 | 3/2008 | Lin et al. |
| 2011/0012920 A1 | 1/2011 | Saigo et al. |
| 2013/0093783 A1* | 4/2013 | Sullivan ................. G09G 5/06 345/601 |
| 2015/0100612 A1 | 4/2015 | Lee et al. |
| 2015/0179135 A1 | 6/2015 | Stauder et al. |

(Continued)

OTHER PUBLICATIONS

Notice of Allowance dated May 23, 2018 for U.S. Appl. No. 15/442,259, 14 pages.

(Continued)

*Primary Examiner* — Yi Wang

(57) ABSTRACT

A processor is configured to store color component values associated with a first subset of vertices of a three-dimensional (3-D) look up table (LUT) in a first subset of memory elements. The color component values are defined according to a destination gamut. A data select module is configured to access the color component values from the first subset of the memory elements concurrently with the processor storing color component values associated with a second subset of the vertices of the 3-D LUT in a second subset of the memory elements. The data select module is configured to access the color component values from the first and second subsets of the memory elements in response to the processor storing the color component values associated with the second subset of the vertices of the 3-D LUT in the second subset of the memory elements. This process can be extended to additional subsets.

20 Claims, 14 Drawing Sheets

(56) References Cited

U.S. PATENT DOCUMENTS

| | | |
|---|---|---|
| 2016/0057454 A1 | 2/2016 | Bordes et al. |
| 2016/0062954 A1 | 3/2016 | Ruff et al. |
| 2016/0117967 A1 | 4/2016 | Buckley et al. |
| 2016/0322024 A1 | 11/2016 | Stauder et al. |
| 2017/0092229 A1 | 3/2017 | Greenbaum et al. |
| 2017/0256039 A1 | 9/2017 | Hsu et al. |

OTHER PUBLICATIONS

Notice of Allowance dated Jul. 25, 2018 for U.S. Appl. No. 15/442,259, 16 pages.

Non-Final Office Action dated Apr. 2, 2018 for U.S. Appl. No. 15/388,663, 37 pages.

Notice of Allowance dated May 23, 2018 for U.S. Appl. No. 15/388,663, 37 Pages.

U.S. Appl. No. 15/442,259, filed Feb. 24, 2017 in the name of Yuxin Chen.

U.S. Appl. No. 15/388,663, filed Dec. 22, 2016 in the name of Yuxin Chen et al.

Bae, Yoonsung, et al., "Gamut-Adaptive Correction in Color Image Processing." Proceedings of 2010 IEEE 17th International Conference on Image Processing, Sep. 26-29, 2010, 4 pages.

Braun, Gustav, et al., "Color Gamut Mapping in a Hue-Linearized CIELAB Color Space." Rochester Institute of Technology, RIT Scholar Works, 1998, 7 pages.

Han, Dongil, "A Cost Effective Color Gamut Mapping Architecture for Digital TV Color Reproduction Enhancement." IEEE Transactions on Consumer Electronics, vol. 51, No. 1, Feb. 1, 2005, 7 pages.

Han, Dongil, "Real-Time Color Gamut Mapping Method for Digital TV Display Quality Enhancement." IEEE Transactions on Consumer Electronics, vol. 50, No. 2, May 2004, 9 pages.

Laird, Justin, et al., "Development and Evaluation of Gamut Extension Algorithms." Color Research and Application, vol. 34, No. 6, Dec. 2009, 9 pages.

Lee, H.S., et al., "A Real Time Color Gamut Mapping Using Tetrahedral Interpolation for Digital TV Color Reproduction Enchancement." IEEE Transactions on Consumer Electronics, vol. 55, No. 2, May 2009, 7 pages.

Lee, K.Y., et al., "General Chromaticity Compression Function for Gamut Mapping." Electronics Letters, vol. 43, No. 5, Mar. 1, 2007, 2 pages.

Lee, H.S., et al., "Implementation of Real Time Color Gamut Mapping Using Neural Network." IEEE Mid-Summer Workshop on Soft Computing in Industrial Applications, Espoo, Finland, Jun. 28-30, 2005, 4 pages.

Luo, M.R., et al., "CIECAM02 and Its Recent Developments." Advanced Color Image Processing and Analysis, Chapter 2, 2013, 41 pages.

Moroney, Nathan, et al., "Field Trials of the CIECAM02 Color Appearance Model." Hewlett-Packard, website: http://www.hpl.hp.com/personal/Nathan_Moroney/cie-2003-moroney.pdf, retrieved Mar. 24, 2017.

Morovic, Jan, et al., "Calculating Medium and Image Gamut Boundaries for Gamut Mapping." Color and Research Application, vol. 25, Issue 6, Dec. 2000, 8 pages.

Yang, C.C., et al., "Efficient Gamut Clipping for Color Image Processing Using LHS and YIQ." Society of Photo-Optical Engineers, vol. 42, No. 3, Mar. 2003, 11 pages.

Notice of Allowance dated Dec. 4, 2018 for U.S. Appl. No. 15/442,259, 13 pages.

Final Office Action dated Oct. 23, 2018 for U.S. Appl. No. 15/388,663, 17 pages.

Notice of Allowance dated May 15, 2019 for U.S. Appl. No. 15/388,663, 17 pages.

\* cited by examiner

US 10,453,171 B2

MULTIPLE STAGE MEMORY LOADING FOR A THREE-DIMENSIONAL LOOK UP TABLE USED FOR GAMUT MAPPING

BACKGROUND

Display devices are used to view images produced by digital processing devices such as desktop computers, laptop computers, televisions, mobile phones, smart phones, tablet computers, digital cameras, and other devices. A wide variety of technologies including cathode-ray tubes (CRTs), liquid crystal displays (LCDs), plasma display panels, and organic light emitting diodes (OLEDs) are used to implement display devices. Consequently, different display devices are able to represent colors within different gamuts. As used herein, the term "gamut" refers to a complete subset of colors that can be accurately represented by a particular display device. The gamuts for two different display devices have the following three possible relationships: (1) gamut 1 is larger than gamut 2, e.g., some colors that can be displayed in device 1 cannot be displayed in device 2, (2) gamut 1 is smaller than gamut 2, e.g., all colors that can be displayed in device 1 can also be displayed in device 2, and (3) gamut 1 partially overlaps with gamut 2.

Furthermore, the same color, as perceived by the human eye, might be represented by different numerical values in different gamuts. For example, the RGB color system is commonly used in computer graphics to represent colors of pixels in images. The same color might be represented by different RGB values in different gamuts. Consequently, gamut mapping is used to map color values between different gamuts so that the perceived colors generated using the color values might be the same in different devices. However, the RGB color system is not perceptually linear so that changes in the colors perceived by the human visual system are not proportional to changes in the RGB values. Other commonly used color systems including the HLS, HSV, and YIQ color systems are also perceptually non-linear. At least in part because of the perceptual nonlinearity of color systems, gamut mapping is difficult to perform in perceptually nonlinear color systems.

Gamut mapping is more straightforward in color systems that are perceptually uniform. As used herein, the phrase "perceptually uniform" refers to a color system in which uniform changes in the components of the color space defined by the color system correspond to uniform changes in perceived color. Relative perceptual differences between colors in a perceptually uniform color system are approximated by treating each color as a point in a three-dimensional (3-D) space and taking the Euclidean distance between the points that represent the two colors. For example, the CIELAB color system is almost perceptually uniform. There are other advanced color systems, such as CIECAM02, which are even more perceptually uniform than CIELAB. Gamut mapping of perceptually non-linear color systems (such as RGB) can therefore be performed by transforming the color values from the perceptually non-linear color system to a perceptually uniform color system (such as CIELAB) and then performing gamut mapping in the perceptually uniform color system. Gamut mapped values of the pixels are then transformed from the perceptually uniform color system back to the perceptually nonlinear color system (such as RGB). Gamut mapping by transformation into perceptually uniform color systems therefore incurs significant computational overhead.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
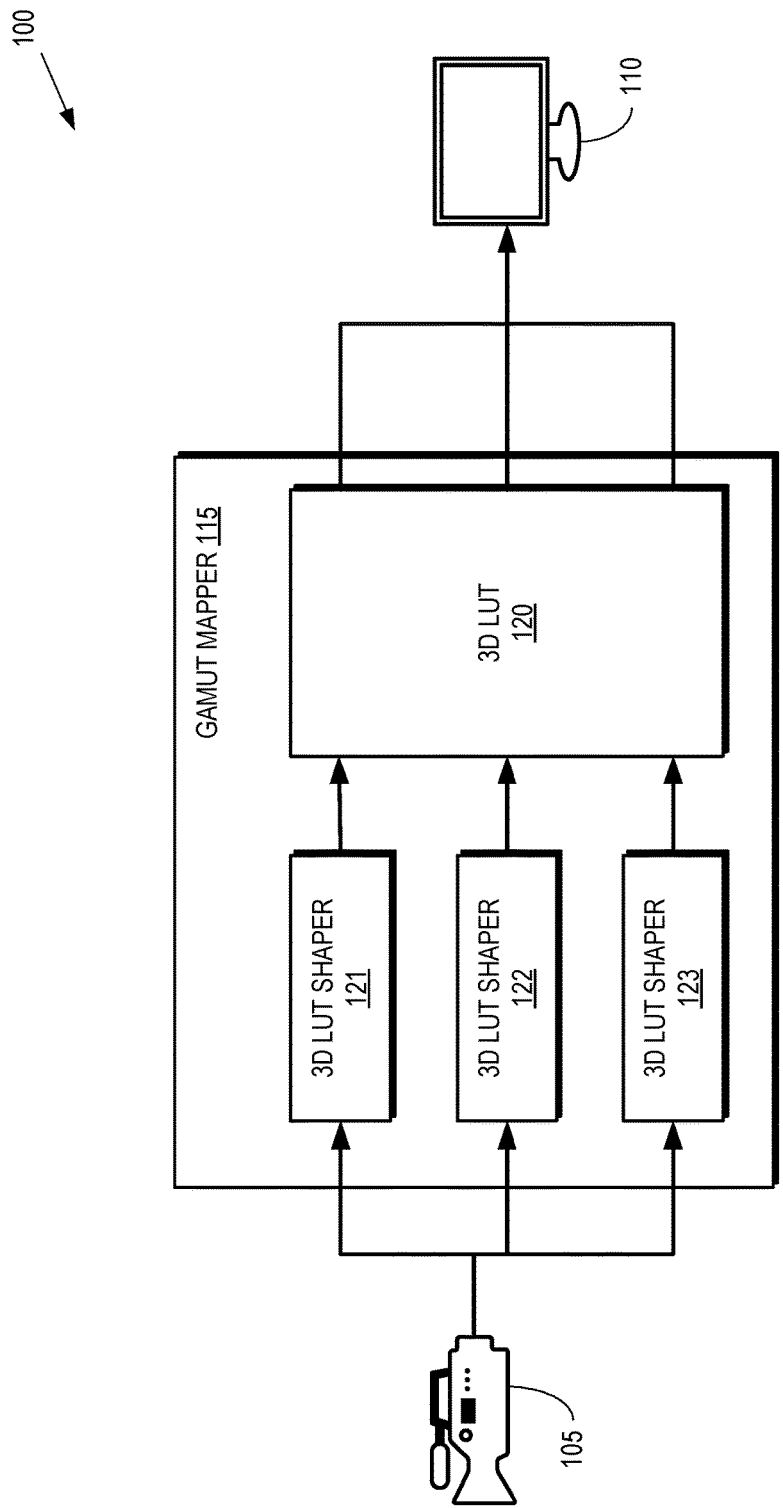
FIG. 1 is a block diagram of an image acquisition and display system according to some embodiments.

The color mapping between two gamuts is conventionally performed using a 3-D look up table (LUT). For example, the three dimensions in the 3-D LUT correspond to the Red, Green, and Blue (RGB) values that represent a pixel color in a source gamut and vertices in the 3-D LUT are associated with the RGB values that represent the same pixel color in a destination gamut. Interpolation is used to compute color component values in the destination gamut for arbitrary RGB values in the source gamut. For example, trilinear or tetrahedral interpolation can be used to compute color component values for an input RGB value based on the color component values of vertices that define a volume that bounds the input RGB value in a corresponding cube or tetrahedron. The color component values in a conventional 3-D LUT are represented by a set of bits in a fixed point format. For example, color component values ranging from 0 . . . 255 are represented by a set of eight bits in a fixed point format. An address decoder uses a subset of the most significant bits (MSBs) of the fixed point format of the input RGB value to identify a corresponding vertex in the 3-D LUT. Consequently, the number of samples along each of the three dimensions of the 3-D LUT are constrained to $(2^m+1)$, where m is the number of MSBs used by the address decoder to identify the vertices in the 3-D LUT. The total number of entries in the 3-D LUT therefore increases geometrically as the number of samples increases, which leads to a corresponding increase in the amount of time required to load values of all of the vertices of the 3-D LUT into the memories.

The time that elapses between initiating loading of values of the vertices of the 3-D LUT and initiating gamut mapping using the 3-D LUT is reduced using a multiple stage memory loading technique to store values of the vertices of the 3-D LUT in a plurality of memory elements. In a first stage, output values of color components defined according to a destination gamut for a first subset of the vertices of the 3-D LUT are stored in a corresponding first subset of the plurality of memory elements. The subset of the vertices are addressed by a reduced number of MSBs that is less than the number (m) of MSBs used by the address decoder to identify the vertices in the full 3-D LUT. For example, the first subset of the vertices can be addressed by m−1 MSBs of a fixed point representation of a color component of an input RGB value that is defined according to a source gamut. An offset value is defined for the input color component using the remaining least significant bits (LSBs) of the fixed point representation of the input color component. For example, if n bits are used to define a value of the input color component, then the offset value is defined using the n−m+1 LSBs of the fixed point representation of the value of the input color component. The input color components can then be interpolated to output color components using values of the first subset of vertices of the 3-D LUT stored in the corresponding first subset of the plurality of memory elements prior to loading information in the other memory elements.

In a second stage, output values of color components defined according to the destination gamut for a second subset of the vertices of the 3-D LUT are stored in a corresponding second subset of the plurality of memory elements. Loading of the second subset of the vertices of the 3-D LUT is performed concurrently with accessing the first subset of the vertices stored in the corresponding first subset of the plurality of memory elements, e.g., for interpolation. Once the second subset of the vertices has been loaded in the second subset of the plurality of memory elements, output values for the first and second subsets of the vertices of the 3-D LUT are addressed using an increased number of the MSBs of the fixed point representation of the input color component. For example, the first and second subsets of the vertices can be addressed by m MSBs of the fixed point representation of a color component of an input RGB value that is defined according to the source gamut. An offset value is defined for the input color component using the remaining least significant bits (LSBs) of the fixed point representation of the input color component. For example, if n bits are used to define a value of the input color component, then the offset value is defined using the n−m LSBs of the fixed point representation of the value of the input color component. The input color components can then be interpolated to output color components using values of the first and second subsets of vertices of the 3-D LUT stored in the corresponding first and second subsets of the plurality of memory elements. In some embodiments, additional stages can be added to store additional output values of color components for additional subsets of the vertices of the 3-D LUT in corresponding additional subsets of the plurality of memory elements.

FIG. 1 is a block diagram of an image acquisition and display system 100 according to some embodiments. The image acquisition and display system 100 includes an image acquisition device 105 that acquires or generates images for display on a display 110. Some embodiments of the image acquisition device 105 are cameras that acquire images (including video images in some cases) of a scene in a digital format. Other embodiments of the image acquisition device 105 are processing systems that are able to generate images (including video images in some cases) for presentation on the display 110. For example, the image acquisition device 105 can include a graphics processing system such as a gaming system that generates images for presentation on the display 110.

The images that are acquired or generated by the image acquisition device 105 are represented by values of pixels. The pixel values are numbers that indicate colors produced by the pixels according to a color system that defines a gamut of colors. For example, the pixel values can include three numbers that indicate Red, Green, and Blue components of the color produced by each pixel. The numbers that represent the pixel values are encoded in a fixed-point format. The display 110 uses the pixel values to determine the color that is generated by each pixel to produce the image that is displayed on the display 110. The display 110 interprets the pixel values in terms of a gamut implemented by the display 110. However, as discussed herein, the gamut used by the image acquisition device 105 to acquire/generate images is not necessarily the same as the gamut used by the display 110 to present the images to a user. Furthermore, different displays can implement different gamuts.

The image acquisition and display system 100 includes a gamut mapper 115 to map pixel values produced by the image acquisition device 105 according to a first gamut to pixel values used by the display 110 to present images to a user according to a second gamut. The gamut mapper 115 includes (or has access to) a 3-D LUT 120 that stores samples of color values in the second gamut corresponding to color values in the first gamut. The 3-D LUT 120 is represented as a lattice having three dimensions that correspond to three color components in the first gamut. For example, the 3-D LUT 120 can be represented as a lattice having a first dimension corresponding to the Red color component, a second dimension corresponding to the Green color component, and a third dimension corresponding to the Blue color component. Each vertex in the 3-D LUT 120 is associated with a sample of color values in the second gamut that correspond to the color values in the first gamut. For example, the color component values ($R_1$, $G_1$, $B_1$) in the first gamut map to a vertex in a lattice of the 3-D LUT 120 that is associated with corresponding color component values ($R_2$, $G_2$, $B_2$) in the second gamut.

In some embodiments, the number of samples along each of the three dimensions of the 3-D LUT 120 is equal to ($2^m$+1), where m is a number of bits in a fixed point representation of a number that is used to identify the vertices in the 3-D LUT 120. For example, the color component values of an input color in the 3-D LUT 120 can be encoded in a fixed point format so that the m MSBs of a fixed point representation of a color component can be used to identify the vertices in the 3-D LUT 120. However, other embodiments of the 3-D LUT 120 can implement flexible addressing of different numbers of samples along the axes of the 3-D LUT 120. An example of flexible addressing is disclosed in U.S. patent application Ser. No. 15/388,663, entitled "FLEXIBLE ADDRESSING FOR A THREE DIMENSIONAL (3-D) LOOK UP TABLE (LUT) USED FOR GAMUT MAPPING," which was filed Dec. 22, 2016 and which is incorporated herein by reference in its entirety.

The color component values of the input color are provided to the gamut mapper 115, which can identify vertices in the 3-D LUT 120 that define a cube or tetrahedron that encompasses a location in the 3-D LUT 120 indicated by the fixed point representation of the component values of the input color. The gamut mapper 115 is further configured to map the input color to an output color defined according to a destination gamut based on the location in the 3-D LUT 120, e.g., using trilinear or tetrahedral interpolation.

Sampling of the 3-D LUT 120 and interpolation based on the sampled values are linear processing techniques, whereas human perception is nonlinear, e.g., the human eye is more sensitive to relative differences between darker tones and lighter tones. Shaping of the input values of the color components is therefore used to account for the nonlinearity of human perception. In the illustrated embodiment, the gamut mapper 115 includes 3-D LUT shapers 121, 122, 123 (collectively referred to herein as "the 3-D LUT shapers 121-123") that perform shaping of the values of the input color components. For example, the 3-D LUT shaper 121 shapes the value of the Red component, the 3-D LUT shaper 122 shapes the value of the Green component, and the 3-D LUT shaper 123 shapes the value of the Blue component.

As discussed herein, loading the samples for all the vertices in the 3-D LUT 120 into corresponding memory elements can be a time-consuming operation and the amount of time required to load all the samples increases geometrically with the number (m) of samples along each dimension of the 3-D LUT 120. Table 1 illustrates the increase in the total number of samples with sample dimension. In order to allow the gamut mapper 115 to begin operation more expeditiously, samples are loaded into the memory elements in multiple stages. Access to the memory elements loaded in a subset of the memory elements during a previous stage (e.g., for interpolation) is performed concurrently with loading samples into another subset of the memory elements during a current stage. Thus, operations such as interpolation for gamut mapping can be performed, albeit at lower precision, before all of the samples have been loaded into all of the memory elements. Operations such as interpolation are performed at successively higher precisions as the subsets of the memory elements are loaded during each successive stage and become available for access.

TABLE 1

| 3D LUT total number of samples vs bit m | | |
|---|---|---|
| Bits m in each dimension | Total number of samples (Total look-up-table entries) | |
| 3 | 9 × 9 × 9 | 729 |
| 4 | 17 × 17 × 17 | 4913 |
| 5 | 33 × 33 × 33 | 35937 |
| 6 | 65 × 65 × 65 | 274625 |
| 7 | 129 × 129 × 129 | 2146689 |

Figure 2:
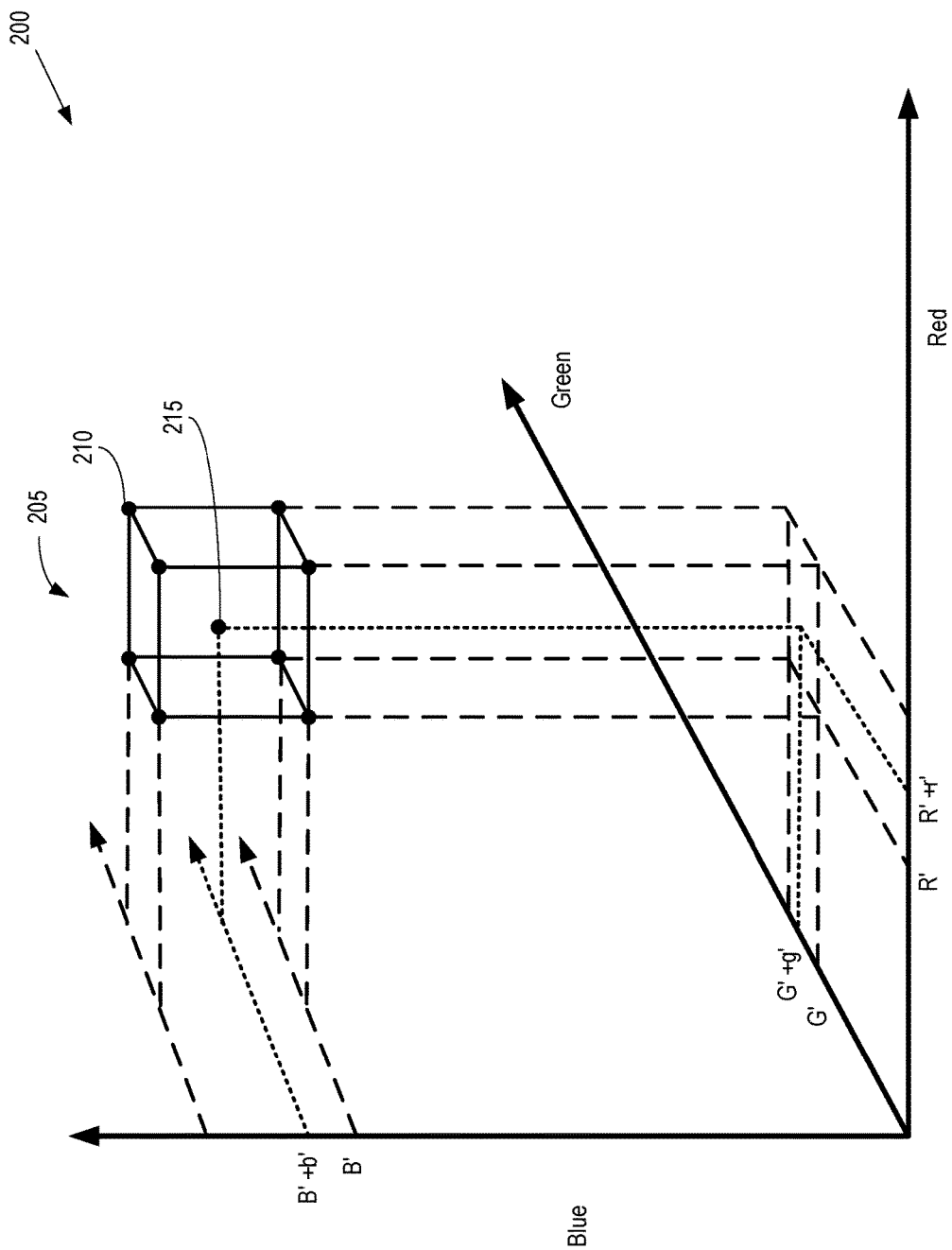
FIG. 2 is a diagram of a portion of a lattice that represents a 3-D LUT according to some embodiments.

FIG. 2 is a diagram of a portion 200 of a lattice that represents a 3-D LUT according to some embodiments. In the interest of clarity, a single cube 205 from the lattice is shown in the portion 200. The cube 205 is defined by a set of vertices 210 (only one indicated by a reference numeral in the interest of clarity) in the lattice. Each vertex 210 is addressed or identified by color component values in a first gamut. For example, the portion 200 of the lattice is defined in an RGB color space so that the three axes of the 3-D LUT correspond to the Red, Green, and Blue color components. The vertex 210 is then identified based on the color component values (R', G', B'). As discussed herein, the color component values (R', G', B') at the vertices 210 are represented in a fixed point format in the 3-D LUT, e.g., the color component values at the sample locations are equal to a fixed point value indicated by a number (m) of MSBs of the color component value corresponding to the vertex 210.

Each of the vertices 210 is associated with mapped color component values in a second gamut. The color component values associated with the vertices 210 can therefore be used to map input colors in the first gamut to output colors in the second gamut by interpolating from the color component values associated with the vertices 210 to locations indicated by the input color in the first gamut. In some embodiments, tetrahedral interpolation is used to determine an output color by interpolating from four of the vertices 210 to the location of the input color. For example, values of the color components in the second gamut associated with four of the vertices 210 can be interpolated to a location 215 in the cube 205 of the lattice that represents the 3-D LUT. The location 215 is indicated by the color components (R'+r', G'+g', B'+b') of the input color of the first gamut. The offsets (r', g', b') relative to the color component values (R', G', B') at the vertices 210 are equal to the remaining least significant bits (LSBs) of the input color in the first gamut.

Figure 3:
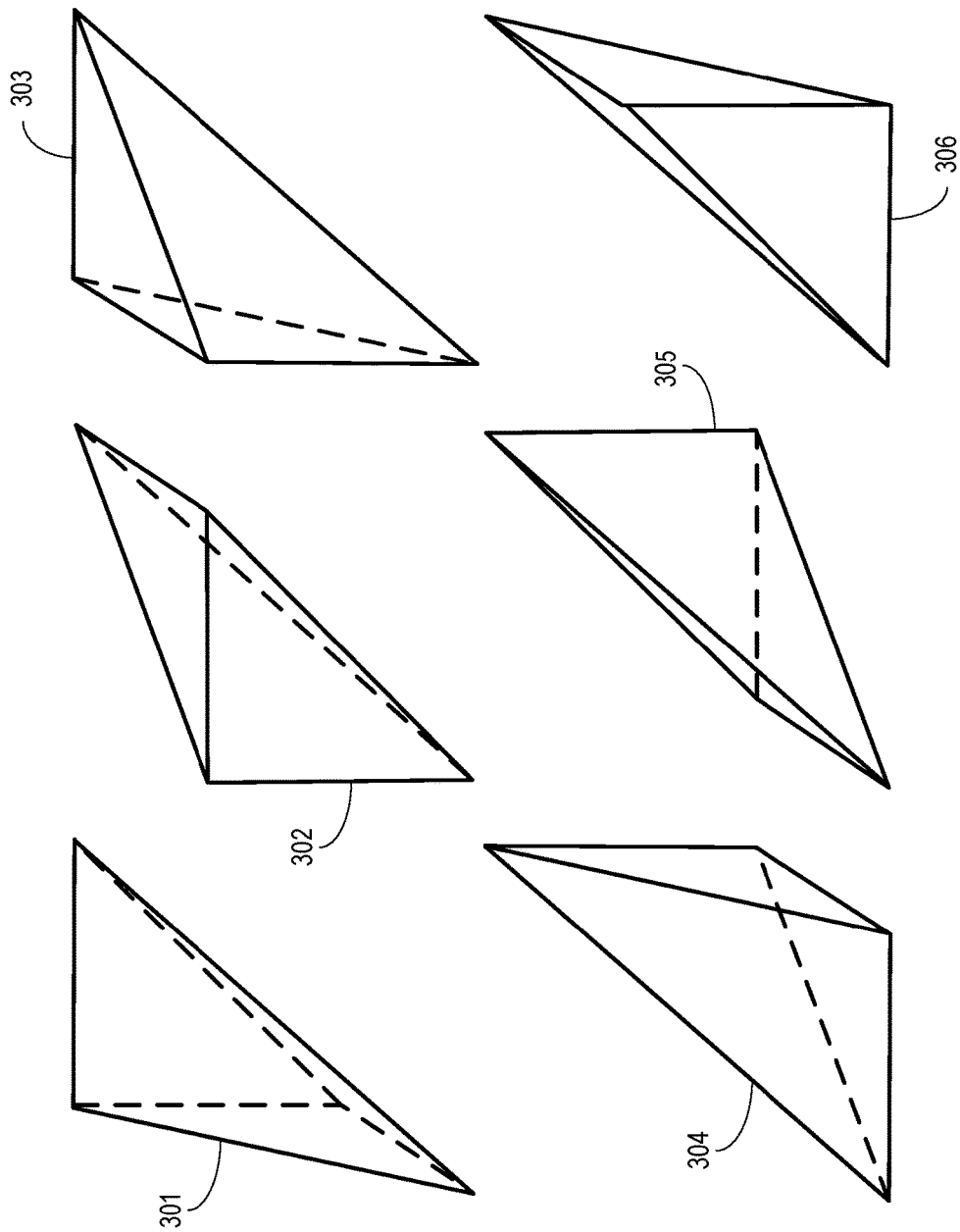
FIG. 3 is a diagram illustrating decomposition of a single cube into six tetrahedrons according to some embodiments.

FIG. 3 is a diagram illustrating decomposition of a single cube into six tetrahedrons 301, 302, 303, 304, 305, 306 according to some embodiments. The six tetrahedrons 301-306 represent some embodiments of the cube 205 shown in FIG. 2. One of the six tetrahedrons 301-306 is selected to perform tetrahedral interpolation based on the location indicated by the color component values of the input color. For example, the tetrahedron 301 is selected if the location indicated by the component values of the input color falls within the tetrahedron 301. The values of the color components in the second gamut are then interpolated from the four vertices of the selected one of the six tetrahedrons 301-306 to the location indicated by the color component values of the input color (in the first gamut) to determine the value of the output color.

Figure 4:
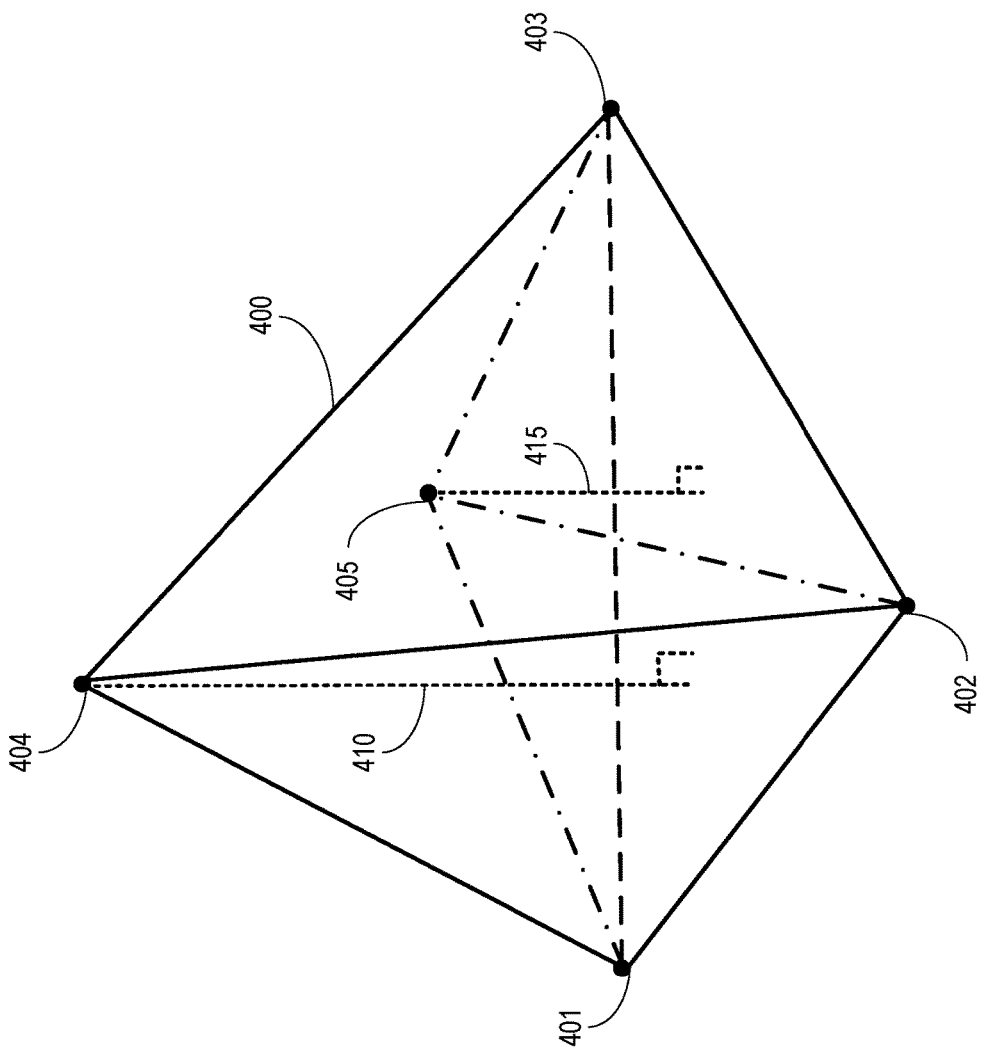
FIG. 4 is a diagram of a tetrahedron used for tetrahedral interpolation according to some embodiments.

FIG. 4 is a diagram of a tetrahedron 400 used for tetrahedral interpolation according to some embodiments. Some embodiments of the tetrahedron 400 represent a selected one of six tetrahedrons that, in combination, represent the cube in the 3-D LUT. For example, the tetrahedron 400 can represent a selected one of the tetrahedrons 301-306 shown in FIG. 3. The tetrahedron 400 has four vertices 401, 402, 403, 404 (collectively referred to herein as "the vertices 401-404") that correspond to vertices in the 3-D LUT. The vertices 401-404 are identified based on a value indicated by indices that are determined based on the input color component values. For example, as discussed herein, the locations of the vertices 401-404 can be identified using a selected number (m) of bits corresponding to the MSBs of a fixed point representation of the input color component values in a first gamut. Each of the vertices 401-404 is associated with color component values in a second gamut. The vertices 401-404 can also be referred to as the vertices A, B, C, D and the associated color component values in the second gamut can be referred to as $o_A$, $o_B$, $o_C$, $o_D$, respectively.

A location of an input point 405 is determined relative to the vertices 401-404 by an offset value, as discussed herein. The interpolated output value for the input color that maps to the input point 405 (also referred to as the input point I) is given by:

$$O_I = \frac{1}{V}(V_A \times O_A + V_B \times O_B + V_C \times O_C + V_D \times O_D)$$

where V is the volume of the tetrahedron 400 and $V_i$ (i=A, B, C, D) is the volume for a sub-tetrahedron. For example, $V_D$ is the volume for a sub-tetrahedron bounded by the vertices IABC. The volumes $V_D$ and V share the same bottom surface ABC, and so the above equation can be rewritten as:

$$O_I = \frac{h_A}{H_A} \times O_A + \frac{h_B}{H_B} \times O_B + \frac{h_C}{H_C} \times O_C + \frac{h_D}{H_D} \times O_D$$

where $H_i$ (i=A, B, C, D) is the height of the volume V from vertices i respectively and $h_i$ (i=A, B, C, D) is the height of the volume $V_i$ from input point I. For example, the height 410 is equivalent to $H_D$ and the height 415 is equivalent to $h_D$. Output weights for corresponding i, (i=A, B, C, D) are defined as:

$$w_i = \frac{h_i \times \Delta}{H_i}$$

where $\Delta$ is the length of a side of the cube. The output value $O_I$ can then be written as:

$$O_I = (w_A \times O_A + w_B \times O_B + w_C \times O_C + w_D \times O_D)/\Delta$$

Interpolation is performed at different precisions depending on a mode or a stage of operation of the 3-D LUT. For example, interpolation is performed at lower precision in a first mode when output values for a subset of the vertices of the 3-D LUT have been stored in a corresponding subset of memory elements. For another example, interpolation is performed at higher precision in a second mode when output values for all of the vertices of the 3-D LUT have been stored in all of the memory elements.

Figure 5:
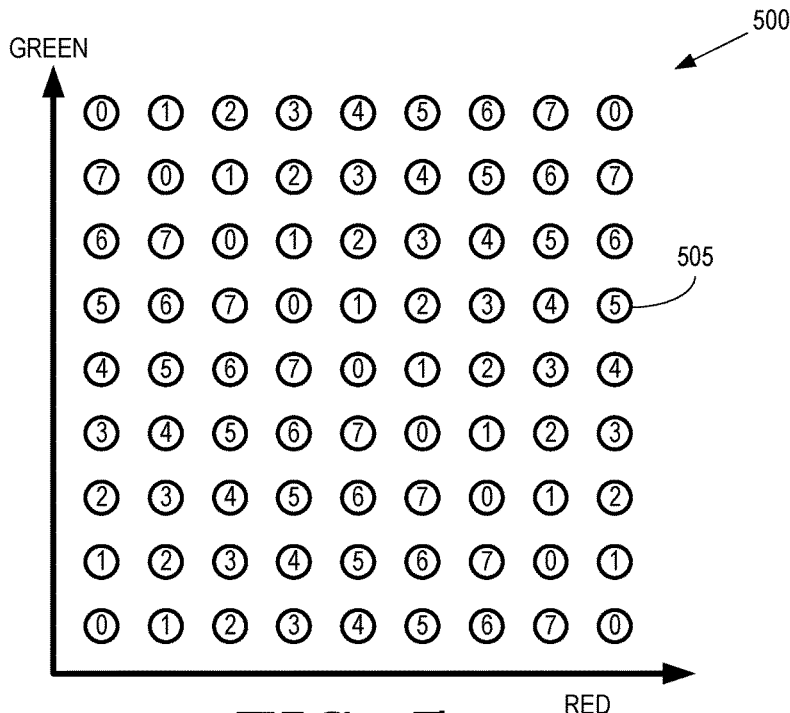
FIG. 5 is a diagram that illustrates a mapping of output color component values at vertices in a first Red-Green plane of the 3-D LUT to corresponding memory elements according to some embodiments.

FIG. 5 is a diagram that illustrates a mapping 500 of output color component values at vertices in a first Red-Green plane of the 3-D LUT to corresponding memory elements according to some embodiments. In the illustrated embodiment, the output color component values are stored in a set of eight memory elements, which can be implemented as random access memory (RAM). The first Red-Green plane of the 3-D LUT includes vertices having different input values of Red and Green component colors for the same input value of the Blue component color, e.g. B=0. The number (m) of samples in this example of the 3-D LUT is nine, although other embodiments can include different numbers of samples.

Each circle 505 (only one indicated by a reference numeral in the interest of clarity) indicates a vertex and the number in the circle 505 indicates the mapping of the vertex to one of the plurality of memory elements. Starting at the bottom left corner of the mapping 500, i.e., R=0, G=0, the output color component value for the bottom left vertex is mapped to (and therefore stored in) the memory element 0, as indicated by the numeral in the corresponding circle. Increasing the value of R by one increment (at fixed G) shifts to the next vertex to the right and the corresponding color component value is mapped to (and therefore stored in) the next memory element, as indicated by the number in the circle that represents the vertex. For example, the output color component values corresponding to successive incremental increases in the value of R (at fixed G) are stored in memory elements 1, 2, 3, 4, . . . , as indicated by the numerals in the corresponding circles. The color component value for the vertex following the vertex that is associated with memory element 7 is stored in memory element 0 and this pattern is repeated for each successive vertex. The output color component value corresponding to the last vertex on the bottom row is stored in the memory element 0.

The mapping 500 then moves to the next row which corresponds to R=0, G=1. Since the output color component value corresponding to the last vertex on the bottom row is stored in the memory elements 0, the output color component value corresponding to the first vertex in the next row is stored in the memory element 1. The output color component values corresponding to successive incremental increases in the value of R (at fixed G=1) are stored in memory elements 2, 3, 4, 5, . . . , as indicated by the numerals in the corresponding circles. The output color component value corresponding to the last vertex on the second row is stored in the memory element 1. The mapping continues in this manner for all the vertices of the 3-D LUT in the B=0 plane. The output color component value corresponding to the last (rightmost) vertex in the top row is stored in the memory element 0. In some embodiments, successive loads or writes to the same memory element are loaded or written continuously to sequential locations in the memory element.

Figure 6:
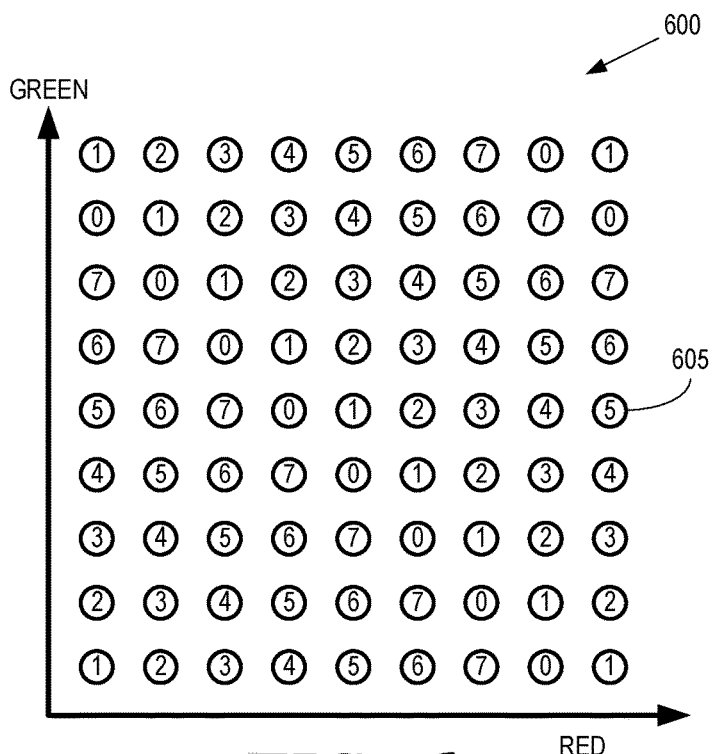
FIG. 6 is a diagram that illustrates a mapping of output color component values at vertices in a second Red-Green plane of the 3-D LUT to corresponding memory elements according to some embodiments.

FIG. 6 is a diagram that illustrates a mapping 600 of output color component values at vertices in a second Red-Green plane of the 3-D LUT to corresponding memory elements according to some embodiments. In the illustrated embodiment, the output color component values are stored in the same set of eight memory elements that are used to store color component values illustrated in FIG. 5. The second Red-Green plane of the 3-D LUT includes vertices having different input values of Red and Green component colors for the same input value of the Blue component color, which is the next input value of the Blue component color relative to the mapping 500 shown in FIG. 5, e.g. B=1.

Each circle 605 (only one indicated by a reference numeral in the interest of clarity) indicates a vertex and the number in the circle 605 indicates the mapping of the vertex to one of the plurality of memory elements. Since the output color component value corresponding to the last (rightmost) vertex in the top row of the mapping 500 of the first Red-Green plane shown in FIG. 5 is stored in the memory element 0, the output color component value for the bottom left vertex of the mapping 600 shown in FIG. 6 for the second Red-Green plane is mapped to (and therefore stored in) the memory element 1, as indicated by the numeral in the corresponding circle. Increasing the value of R by one increment (at fixed G) shifts to the next vertex to the right and the corresponding color component value is mapped to (and therefore stored in) the next memory element, as indicated by the number in the circle representing the vertex. For example, the output color component values corresponding to successive incremental increases in the value of R (at fixed G) are stored in memory elements 2, 3, 4, 5, . . . , as indicated by the numerals in the corresponding circles. The color component value for the vertex following the vertex that is associated with memory element 7 is stored in memory element 0 and this pattern is repeated for each successive vertex. The output color component value corresponding to the last vertex on the bottom row of the mapping 600 is stored in the memory element 1.

The mapping 600 then moves to the next row which corresponds to R=0, G=1. Since the output color component value corresponding to the last vertex on the bottom row is stored in the memory elements 1, the output color component value corresponding to the first vertex in the next row is stored in the memory element 2. The output color component values corresponding to successive incremental increases in the value of R (at fixed G=1) are stored in memory elements 3, 4, 5, 6, . . . , as indicated by the numerals in the corresponding circles. The output color component value corresponding to the last vertex on the second row is stored in the memory element 2. The mapping continues in this manner for all the vertices of the 3-D LUT in the B=1 plane. The output color component value corresponding to the last (rightmost) vertex in the top row is stored in the memory element 1.

Figure 7:
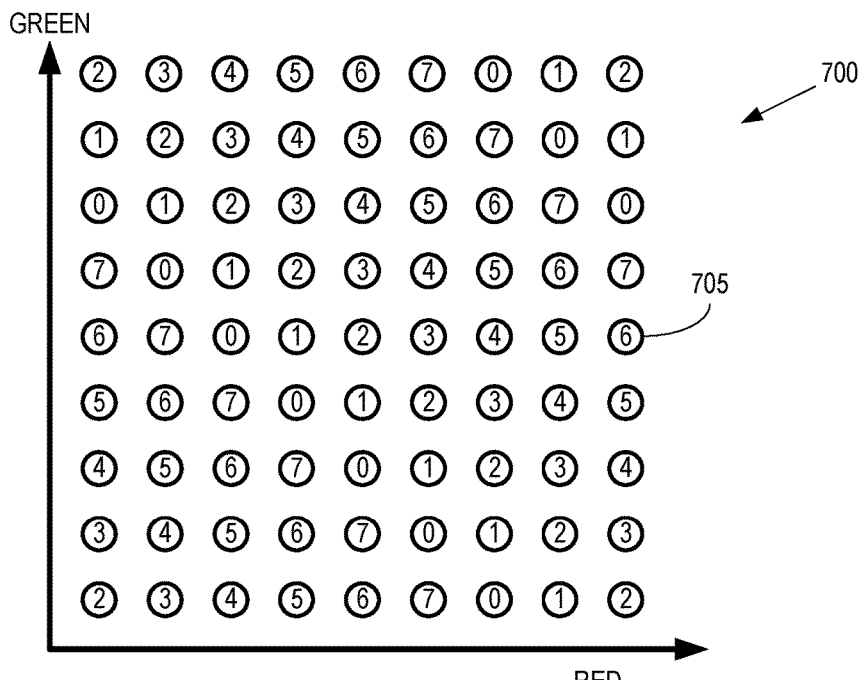
FIG. 7 is a diagram that illustrates a mapping of output color component values at vertices in a third Red-Green plane of the 3-D LUT to corresponding memory elements according to some embodiments.

FIG. 7 is a diagram that illustrates a mapping 700 of output color component values at vertices in a third Red-Green plane of the 3-D LUT to corresponding memory elements according to some embodiments. In the illustrated embodiment, the output color component values are stored in the same set of eight memory elements that are used to store color component values illustrated in FIGS. 5 and 6. The third Red-Green plane of the 3-D LUT includes vertices having different input values of Red and Green component colors for the same input value of the Blue component color, which is the next input value of the Blue component color relative to the mapping 600 shown in FIG. 6, e.g. B=2.

Each circle 705 (only one indicated by a reference numeral in the interest of clarity) indicates a vertex and the number in the circle 705 indicates the mapping of the vertex to one of the plurality of memory elements. Since the output color component value corresponding to the last (rightmost) vertex in the top row of the mapping 600 of the second Red-Green plane shown in FIG. 6 is stored in the memory element 1, the output color component value for the bottom left vertex of the mapping 700 shown in FIG. 7 for the third Red-Green plane is mapped to (and therefore stored in) the memory element 2, as indicated by the numeral in the corresponding circle. Increasing the value of R by one increment (at fixed G) shifts to the next vertex to the right and the corresponding color component value is mapped to (and therefore stored in) the next memory element, as indicated by the number in the circle representing the vertex. For example, the output color component values corresponding to successive incremental increases in the value of R (at fixed G) are stored in memory elements 3, 4, 5, 6, . . . , as indicated by the numerals in the corresponding circles. The color component value for the vertex following the vertex that is associated with memory element 7 is stored in memory element 0 and this pattern is repeated for each successive vertex. The output color component value corresponding to the last vertex on the bottom row of the mapping 700 is stored in the memory element 2.

The mapping 700 then moves to the next row which corresponds to R=0, G=1. Since the output color component value corresponding to the last vertex on the bottom row is stored in the memory element 2, the output color component value corresponding to the first vertex in the next row is stored in the memory element 3. The output color component values corresponding to successive incremental increases in the value of R (at fixed G=1) are stored in memory elements 4, 5, 6, 7, . . . , as indicated by the numerals in the corresponding circles. The output color component value corresponding to the last vertex on the second row is stored in the memory element 3. The mapping continues in this manner for all the vertices of the 3-D LUT in the B=2 plane. The output color component value corresponding to the last (rightmost) vertex in the top row is stored in the memory element 2. The mappings 500, 600, 700 shown in FIGS. 5-7 is continued for the remaining Red-Green planes corresponding to different values of the Blue component to form a complete mapping of the vertices of the 3-D LUT to the eight memory elements.

Figure 8:
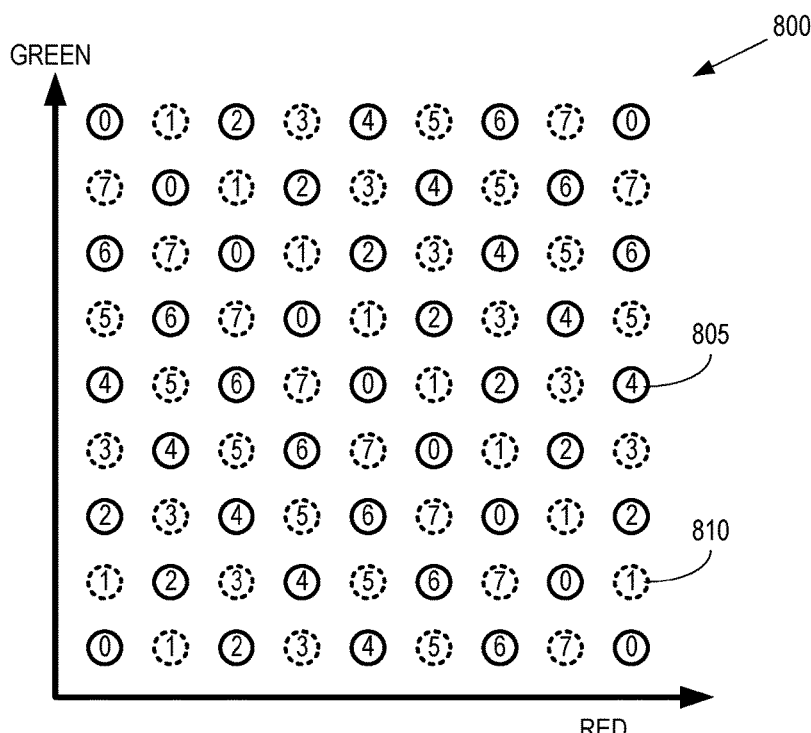
FIG. 8 is a diagram that illustrates storage of output color component values corresponding to a subset of the vertices of the 3-D LUT in a subset of the memory elements indicated by a mapping of output color component values at vertices in the first Red-Green plane of the 3-D LUT to corresponding memory elements according to some embodiments.

FIG. 8 is a diagram that illustrates storage of output color component values corresponding to a subset of the vertices of the 3-D LUT in a subset of the memory elements indicated by a mapping 800 of output color component values at vertices in the first Red-Green plane of the 3-D LUT to corresponding memory elements according to some embodiments. The mapping 800 corresponds to the mapping 500 shown in FIG. 5. In the illustrated embodiment, the output color component values are stored in a subset of the set of eight memory elements that are available to store color component values. For example, during a first stage, the output color component values for a first subset of the vertices of the 3-D LUT are stored in a corresponding first subset of the memory elements indicated by numerals 0, 2, 4, 6, as indicated by the solid circles 805. As discussed herein, the first subset of the vertices can be addressed using a small number of MSBs than the larger number of MSBs that are required to address the full set of vertices in the 3-D LUT. Output color component values for a second subset of the vertices of the 3-D LUT are not stored in a corresponding second subset of the memory elements indicated by numerals 1, 3, 5, 7 during the first stage, as indicated by the dashed circles 810. Output color component values for the second subset of the vertices are stored in the second subset of the memory elements during a second stage that is subsequent to the first stage.

Figure 9:
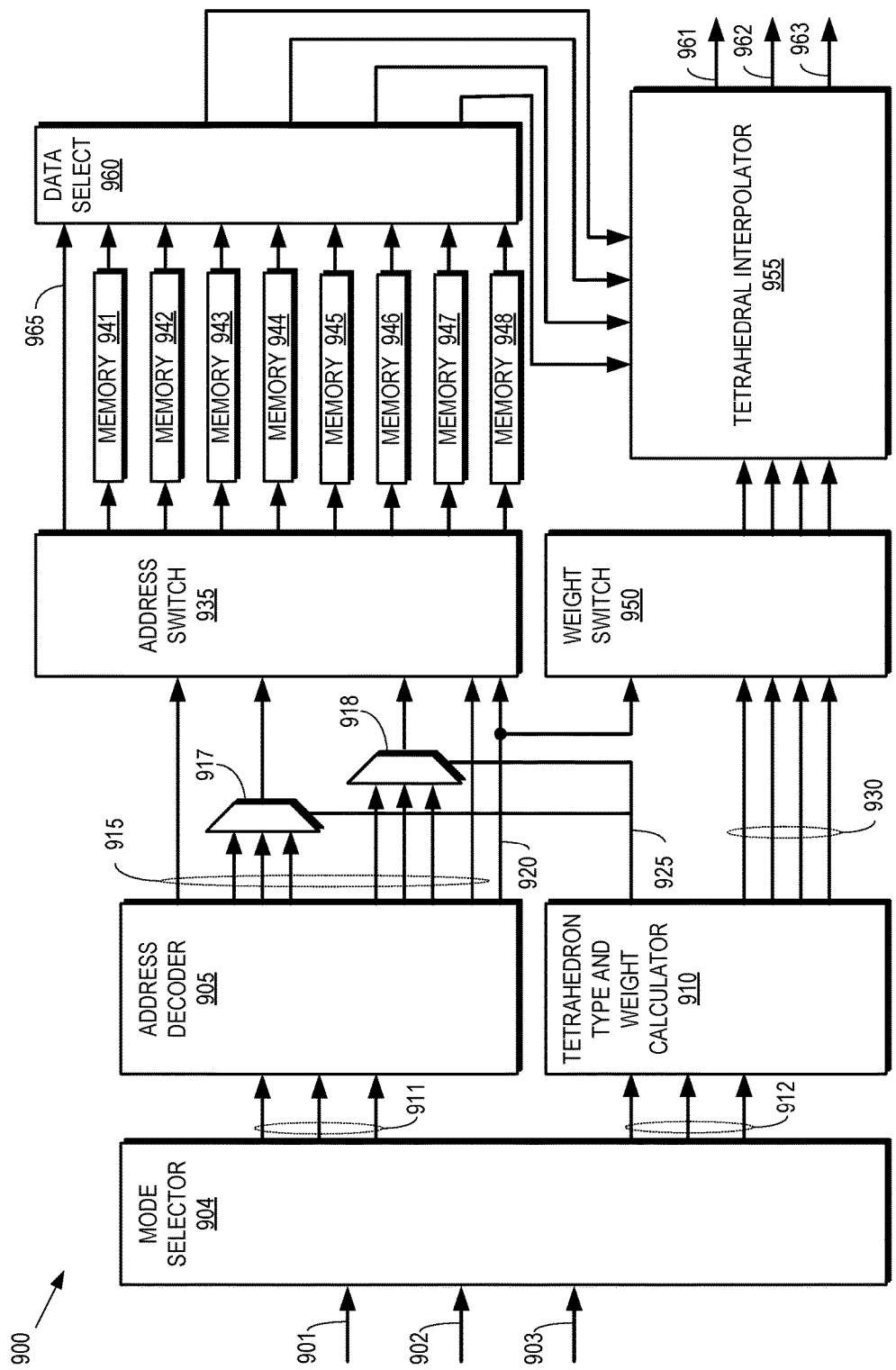
FIG. 9 is a block diagram of a 3-D LUT according to some embodiments.

FIG. 9 is a block diagram of a 3-D LUT 900 according to some embodiments. The 3-D LUT 900 is used to implement some embodiments of the 3-D LUT 120 shown in FIG. 1. The illustrated embodiment of the 3-D LUT 900 is implemented using a linear spacing of samples along each axis of the 3-D LUT, e.g., the Red, Green, and Blue axes in the portion 200 of the 3-D LUT illustrated in FIG. 2. Thus, a number (m) of bits are used to represent $2^m+1$ samples along the axes of the 3-D LUT 900. However, other embodiments of the 3-D LUT 900 can implement flexible addressing of different numbers of samples along the axes of the 3-D LUT 900, as discussed herein. The 3-D LUT 900 is described for an embodiment that implements two-stage memory loading. However, other embodiments of the 3-D LUT 900 can be configured to implement memory loading in more than two stages.

The 3-D LUT 900 receives input information representative of values of the color components of an input color in a first gamut. The input data includes fixed-point representations of the color components $R_{in}$, $G_{in}$, $B_{in}$, which are received on the input lines 901, 902, 903, collectively referred to herein as "the input lines 901-903." In the illustrated embodiment, the 3-D LUT 900 is configured to perform tetrahedral interpolation. However, other embodiments can be configured to perform trilinear interpolation or other types of interpolation.

The fixed point representations received on the input lines 901-903 are provided to a mode selector 904 that determines an operational mode of the 3-D LUT 900. Some embodiments of the 3-D LUT 900 are able to operate in multiple operational modes that correspond to loading and accessing output component color values for different subsets of vertices of the 3-D LUT. For example, in a first operational mode, output color component values for a first subset of vertices have been stored in a corresponding first subset of memory elements and can therefore be accessed concurrently with storing output color component values of a second subset of vertices in a second subset of the memory elements. The first subset of vertices is addressed using a first number (m−1) of MSBs of a fixed point representation of an input color component defined according to a source gamut. For another example, in a second operational mode, output color component values for the first and second subsets of the vertices can be accessed from the first and second subsets of the memory elements. The second subset of vertices is addressed using a second number (m) of MSBs of the fixed point representation of the input color component.

The mode selector 904 can also determine offsets associated with the indices using the LSBs of the fixed point representation of the input color component that are not used to define the indices. For example, if the fixed point representation includes n bits, the offset includes (n−m+1) bits in the first operational mode and (n−m) bits in the second operational mode.

The values 911 of the indices for each of the color components $R_{in}$, $G_{in}$, $B_{in}$ are provided to an address decoder 905 and values 912 of the offsets for each of the color components $R_{in}$, $G_{in}$, $B_{in}$ are provided to a module 910 that determines a type of tetrahedron used for interpolation and calculates weights for the interpolation, as discussed herein. The address decoder 905 generates signals 915 that indicate the vertices of a cube that bound a location of the input color and a subset of the signals 915 are provided to multiplexers 917, 918. The address decoder 905 also generates a signal 920 representative of a type of the 3-D LUT, as discussed herein.

The module 910 generates selection signals 925 that are provided to the multiplexers 917, 918 to select the output of the multiplexers 917, 918. The selection signal 925 is determined based on a type of tetrahedron used for interpolation. The module 910 also generates weights 930 that correspond to the type of tetrahedron used for the interpolation.

Signals generated by the address decoder 905 and the multiplexers 917, 918 are provided to an address switch 935 that performs address switching, as disclosed herein. Addresses determined by the address switch 935 are used to identify memory locations in the memory elements 941, 942, 943, 944, 945, 946, 947, 948 which are collectively referred to herein as "the memory elements 941-948." Values of color components in the second gamut that are associated with the vertices in the 3-D LUT are stored in the memory elements 941-948. The color component values can be distributed among the memory elements 941-948 so that interpolation can be performed using values that are retrieved concurrently from the memory elements 941-948. As discussed herein, the output color component values are stored in subsets of the memory elements 941-948 during different stages. Thus, different subsets of the memory elements 941-948 are accessed in different operational modes. For example, the memory elements 941, 943, 945, 947 can be accessed in the first operational mode and the memory elements 941-948 can be accessed in the second operational mode.

The signal 920 is also provided to a weight switch 950, which also receives the signals (weights) 930 generated by the module 910. The weight switch 950 performs weight switching as disclosed herein. Signals representative of weights generated by the weight switch 950 are provided to a tetrahedral interpolator 955, which also receives color component values of the vertices of a tetrahedron from the memory elements 941-948 via a data select module 960 that selectively provides information accessed from the memory elements 941-948 dependent upon the operational mode of the 3-D LUT 900. The data select module 960 therefore receives a signal 965 that indicates the LUT type, e.g., the address switch 935 generates the signal 965 in response to the signal 920 received from the module 905. The tetrahedral interpolator 955 uses the weights and the color component values to generate an output value by tetrahedral interpolation. The output color component values are provided on the lines 961, 962, 963.

Figure 10:
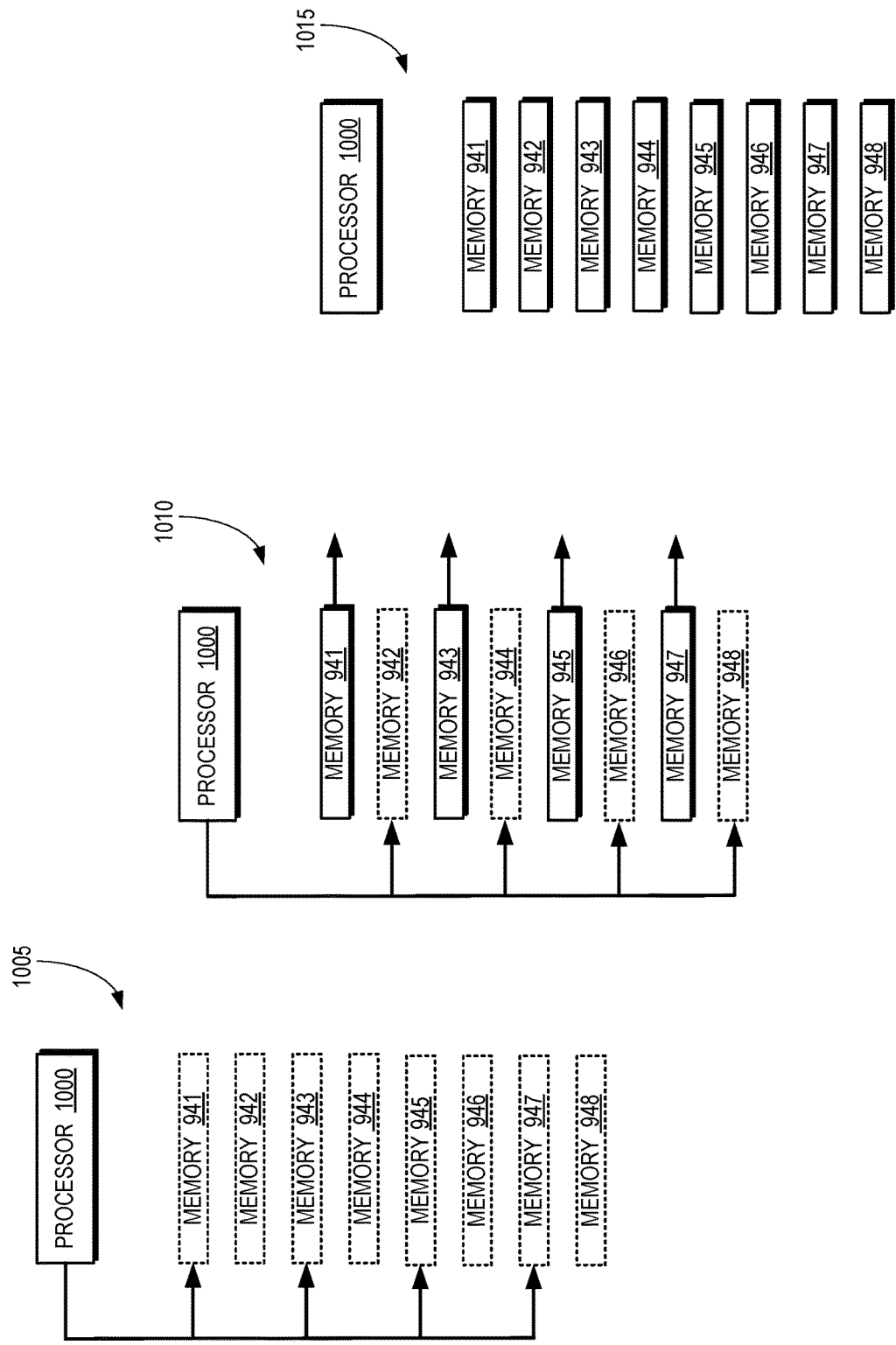
FIG. 10 is a block diagram that illustrates loading of subsets of the memory elements in multiple stages according to some embodiments.

FIG. 10 is a block diagram that illustrates loading of subsets of the memory elements 941-948 in multiple stages according to some embodiments. A processor 1000 is configured to selectively load output color component values for subsets of the vertices of a 3-D LUT into corresponding subsets of the memory elements 941-948. Initially, output color component values have not been stored in any of the memory elements 941-948, as indicated by the dashed boxes.

In a first stage 1005, the processor 1000 selectively loads output color component values for a first subset of the vertices of the 3-D LUT into the first subset of the memory elements 941, 943, 945, 947. Some embodiments of the processor 1000 can load the output color component values into the first subset 941, 943, 945, 947 according to the mapping 800 shown in FIG. 8.

In a second stage 1010, the processor 1000 selectively loads output color component values for a second subset of the vertices of the 3-D LUT into a second subset of the memory elements 942, 944, 946, 948. The second stage 1010 begins after the first stage 1005 has ended so that the output color component values have been stored in the first subset of the memory elements 941, 943, 945, 947, as indicated by the solid shadowed boxes. Output color component values can therefore be accessed from the first subset of the memory elements 941, 943, 945, 947 concurrently with loading the output color component values into the second subset of the memory elements 942, 944, 946, 948.

At 1015, the processor 1000 has completed loading output color component values into the memory elements 941-948, as indicated by the solid shadowed boxes. Output color component values can therefore be accessed from any of the memory elements 941-948.

Figure 11:
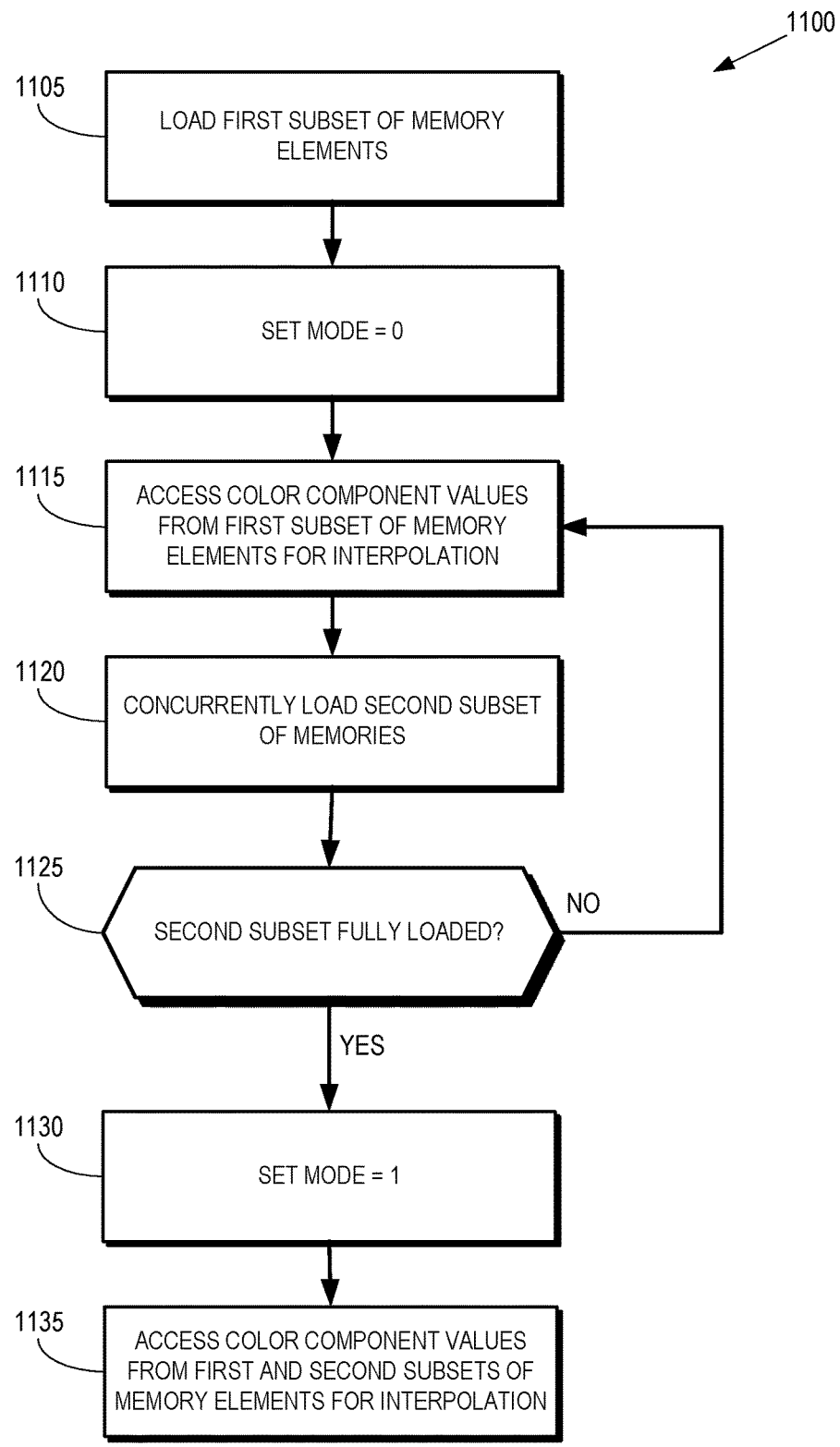
FIG. 11 is a flow diagram of a method for performing multiple stage memory loading for a 3-D LUT according to some embodiments.

FIG. 11 is a flow diagram of a method 1100 for performing multiple stage memory loading for a 3-D LUT according to some embodiments. The method 1100 is implemented in some embodiments of the 3-D LUT 120 shown in FIG. 1 and the 3-D LUT 900 shown in FIG. 9.

At block 1105, a processor loads a first subset of memory elements in the 3-D LUT. As discussed herein, the first subset of the memory elements stores output color component values for a corresponding first subset of the vertices of the 3-D LUT. Once loading of the first subset of memory elements is complete, an operational mode of the 3-D LUT is set to a first mode, as indicated by setting a mode value to 0 at block 1110.

At block 1115, output color component values are accessed from the first subset of memory elements to perform operations such as interpolation. At block 1120, the processor loads output color component values for a second subset of vertices of the 3-D LUT in a corresponding second subset of memory elements. Loading of the second subset of memory elements is performed concurrently with accessing output color component values from the first subset of memory elements.

At decision block 1125, the processor determines whether the second subset of memory elements has been fully loaded. If not, the method 1100 flows to block 1115 and output color component values are accessed from the first subset of memory elements concurrently with ongoing loading of the second subset of memory elements (at block 1120). If the second subset of memory elements has been fully loaded, the method flows to block 1130.

At block 1130, the operational mode of the 3-D LUT is set to a second operational mode, as indicated by setting a mode value to 1. Both the first and second subsets of the memory elements include output color component values for corresponding first and second subsets of the vertices of the 3-D LUT. The output color component values can therefore be accessed (at block 1135) from the first and second subsets of memory elements to perform operations such as interpolation.

Figure 12:
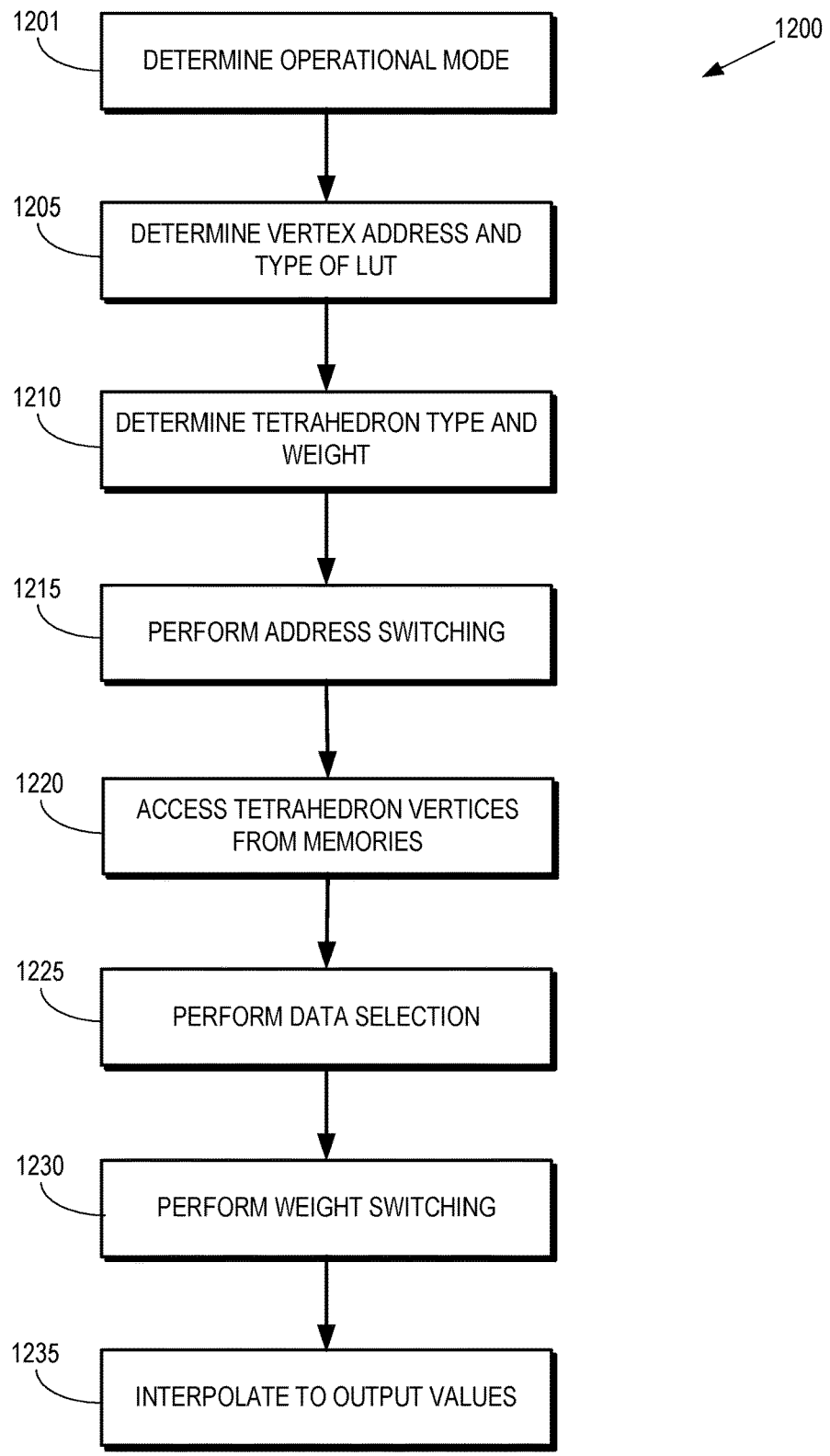
FIG. 12 is a flow diagram of a method of performing mode-dependent tetrahedral interpolation in a 3-D LUT that supports multiple stage memory loading according to some embodiments.

FIG. 12 is a flow diagram of a method 1200 of performing mode-dependent tetrahedral interpolation in a 3-D LUT that supports multiple stage memory loading according to some embodiments. The method 1200 is implemented in some embodiments of the 3-D LUT 120 shown in FIG. 1 and the 3-D LUT 900 shown in FIG. 9. The steps of the method 1200 are illustrated in sequential order in the interest of clarity. However, some embodiments of the method 1200 are able to perform some steps concurrently or in a different order.

At block 1201, a mode selector such as the mode selector 904 shown in FIG. 9 determines a current operational mode of the 3-D LUT. For example, the mode selector can determine that the 3-D LUT is operating in a low precision mode (indicated by a mode value of 0) in which output color component values are only available for access from a subset of memory elements associated with a subset of vertices of the 3-D LUT. For another example, the mode selector can determine that the 3-D LUT is operating in a normal precision mode (indicated by a mode value of 1) in which output color component values are available for access from all of the memory elements associated with the vertices of the 3-D LUT.

The mode selector is therefore able to determine indices and offsets based on n-bit input color component values $R_{in}$, $G_{in}$, or $B_{in}$. For example, the m bits mode-dependent color component indices are defined as:

$$R\_index = \begin{cases} \{R_{in}[n-1:n-m+1], 0\} & \text{if mode} = 0 \\ R_{in}[n-1:n-m] & \text{if mode} = 1 \end{cases}$$

$$G\_index = \begin{cases} \{G_{in}[n-1:n-m+1], 0\} & \text{if mode} = 0 \\ G_{in}[n-1:n-m] & \text{if mode} = 1 \end{cases}$$

$$B\_index = \begin{cases} \{B_{in}[n-1:n-m+1], 0\} & \text{if mode} = 0 \\ B_{in}[n-1:n-m] & \text{if mode} = 1 \end{cases}$$

where $\{X,0\}$ stands for padding 0 in the end of the binary value X. The mode-dependent offset values are defined as:

$$R\_offset = \begin{cases} R_{in}[n-m:0] & \text{if mode} = 0 \\ R_{in}[n-m-1:0] & \text{if mode} = 1 \end{cases}$$

$$G\_offset = \begin{cases} G_{in}[n-m:0] & \text{if mode} = 0 \\ G_{in}[n-m-1:0] & \text{if mode} = 1 \end{cases}$$

$$B\_offset = \begin{cases} B_{in}[n-m:0] & \text{if mode} = 0 \\ B_{in}[n-m-1:0] & \text{if mode} = 1 \end{cases}$$

In the above equation, the offsets have different bits in the different modes. However, some embodiments truncate the LSB in mode 0 or pad with zero in mode 1. In the following discussion, the indices are indicated by capital letters (R, G, B) and the offsets are indicated by lowercase letters (r, g, b).

At block 1205, an address decoder such as the address decoder 905 shown in FIG. 9 determines a vertex address of a vertex in the 3-D LUT and a type of LUT based on the RGB indices provided by the mode selector. The address decoder also uses the address of the vertex to identify one or more neighboring vertices in the 3-D LUT. Some embodiments of the address decoder determine the vertex addresses by determining a value of a counter based on the RGB indices:

Counter=$(2^m+1)(2^m+1)B+(2^m+1)G+R$

The value of the counter can also be expressed as:

Counter=$(2^m+2^{m+1}+1)B+(2^m+1)G+R$

A remainder of the counter by eight is computed:

$L$=rem(Counter/8)

Figure 13:
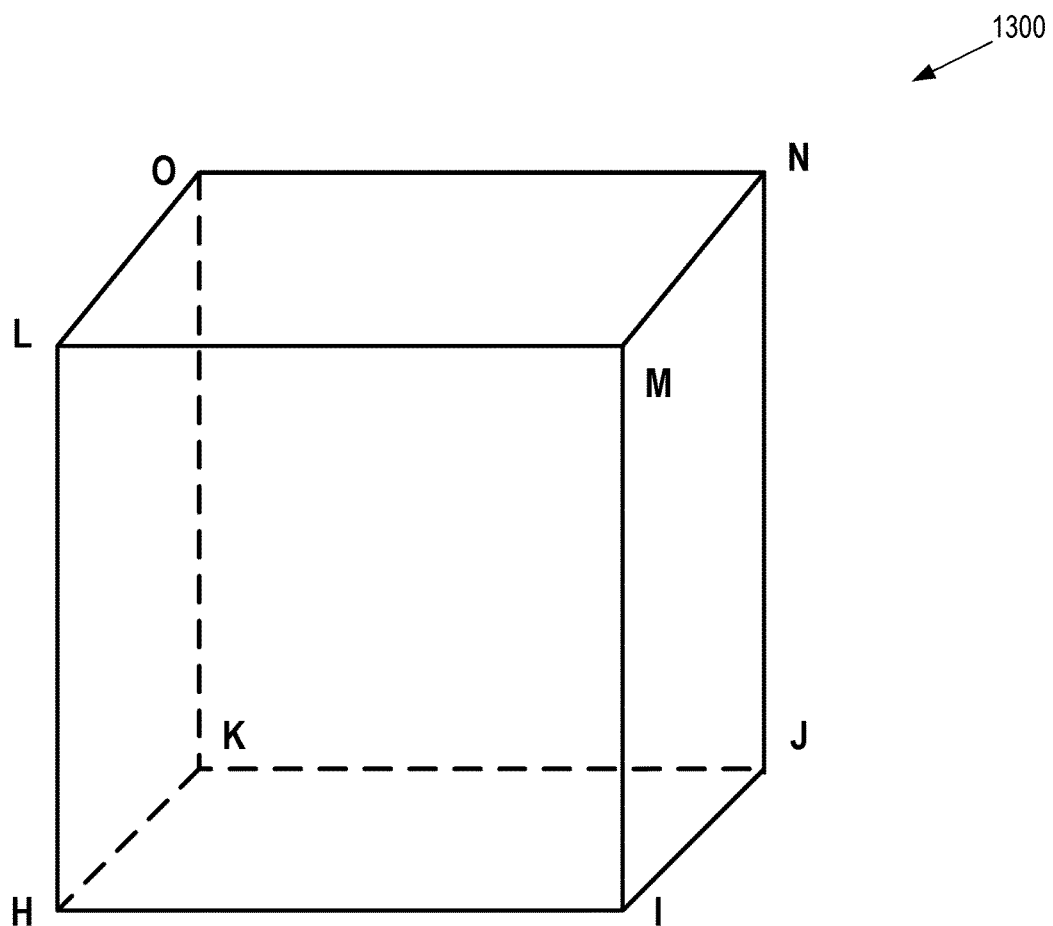
FIG. 13 illustrates a cube that encompasses the location of an input color in the 3-D LUT according to some embodiments.

The vertex addresses of a cube that encompasses the location of the input color are determined based on the counter. The vertices are identified by the letters H, I, J, K, L, M, N, O, as indicated in FIG. 13, which illustrates a cube 1300 that encompasses the location of an input color in the 3-D LUT according to some embodiments. For example, the cube 1300 can represent some embodiments of the cube 205 that encompasses the location 215 shown in FIG. 2. The vertex addresses are computed as follows:

$$\begin{cases} H = A_B \\ I = A_B + \alpha \\ J = A_B + 2^{m-2-mode} + \beta \\ K = A_B + 2^{m-2-mode} + \alpha \\ L = A_B + 2^{2m-2-mode} + 2^{m-1-mode} + \alpha \\ M = A_B + 2^{2m-2-mode} + 2^{m-1-mode} + \beta \\ N = A_B + 2^{2m-2-mode} + 2^{m-1-mode} + 2^{m-2-mode} + \gamma \\ O = A_B + 2^{2m-2-mode} + 2^{m-1-mode} + 2^{m-2-mode} + \beta \end{cases}$$

where $$\alpha = \begin{cases} 1 & \text{if } L = 6 \text{ when mode} = 0 \\ 1 & \text{if } L = 7 \text{ when mode} = 1 \\ 0 & \text{otherwise} \end{cases}$$

$$\beta = \begin{cases} 1 & \text{if } L \geq 4 \text{ when mode} = 0 \\ 1 & \text{if } L \geq 6 \text{ when mode} = 1 \\ 0 & \text{otherwise} \end{cases}$$

$$\gamma = \begin{cases} 1 & \text{if } L \geq 2 \text{ when mode} = 0 \\ 1 & \text{if } L \geq 5 \text{ when mode} = 1 \\ 0 & \text{otherwise} \end{cases}$$

$A_B$=floor(Counter/8), and floor rounds the element in the bracket to the nearest integer towards 0.

Figure 14:
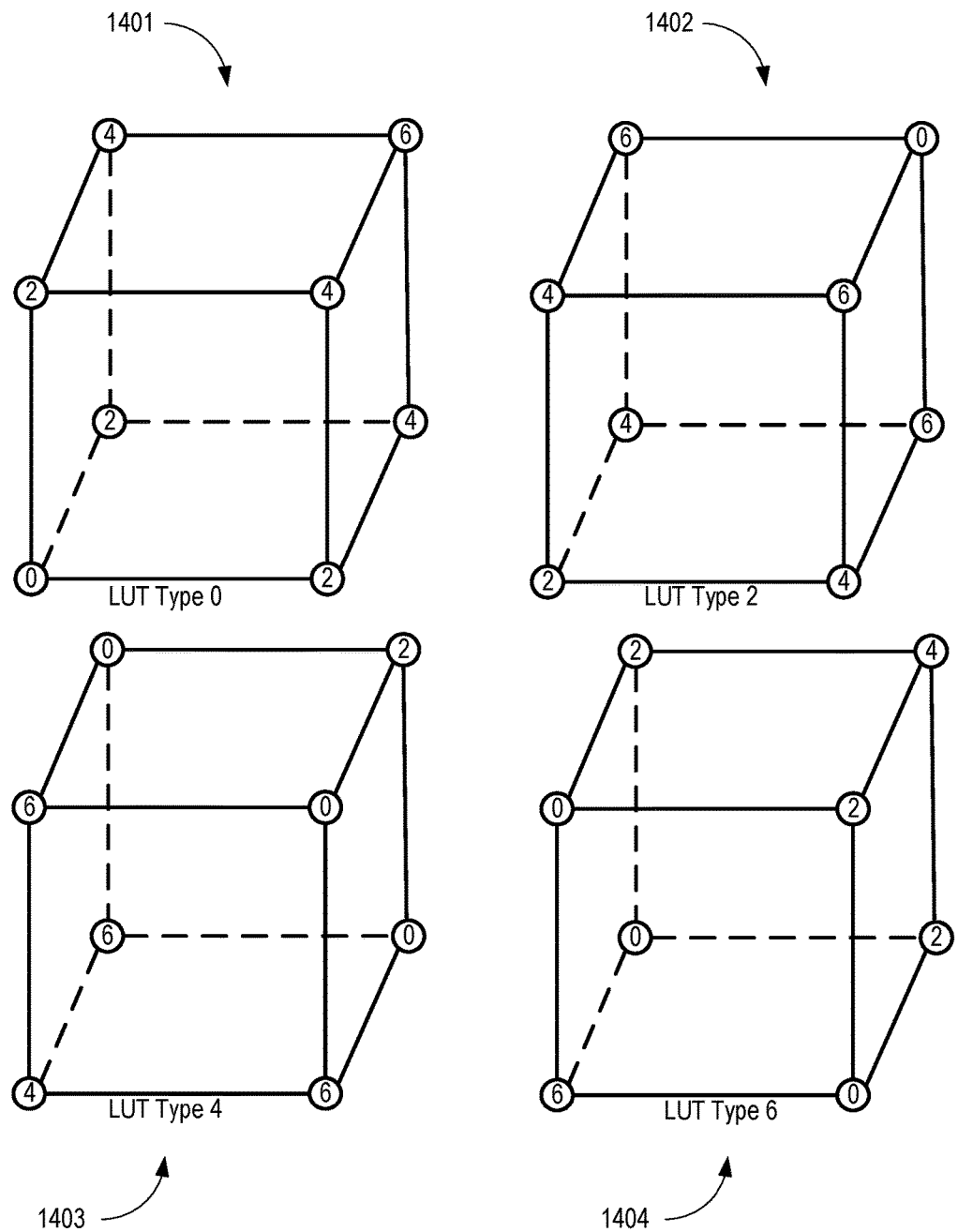
FIG. 14 is a diagram that illustrates a first set of LUT types for a set of cubes in a lattice that represents the 3-D LUT for a low precision mode (mode 0) according to some embodiments
Figure 15:
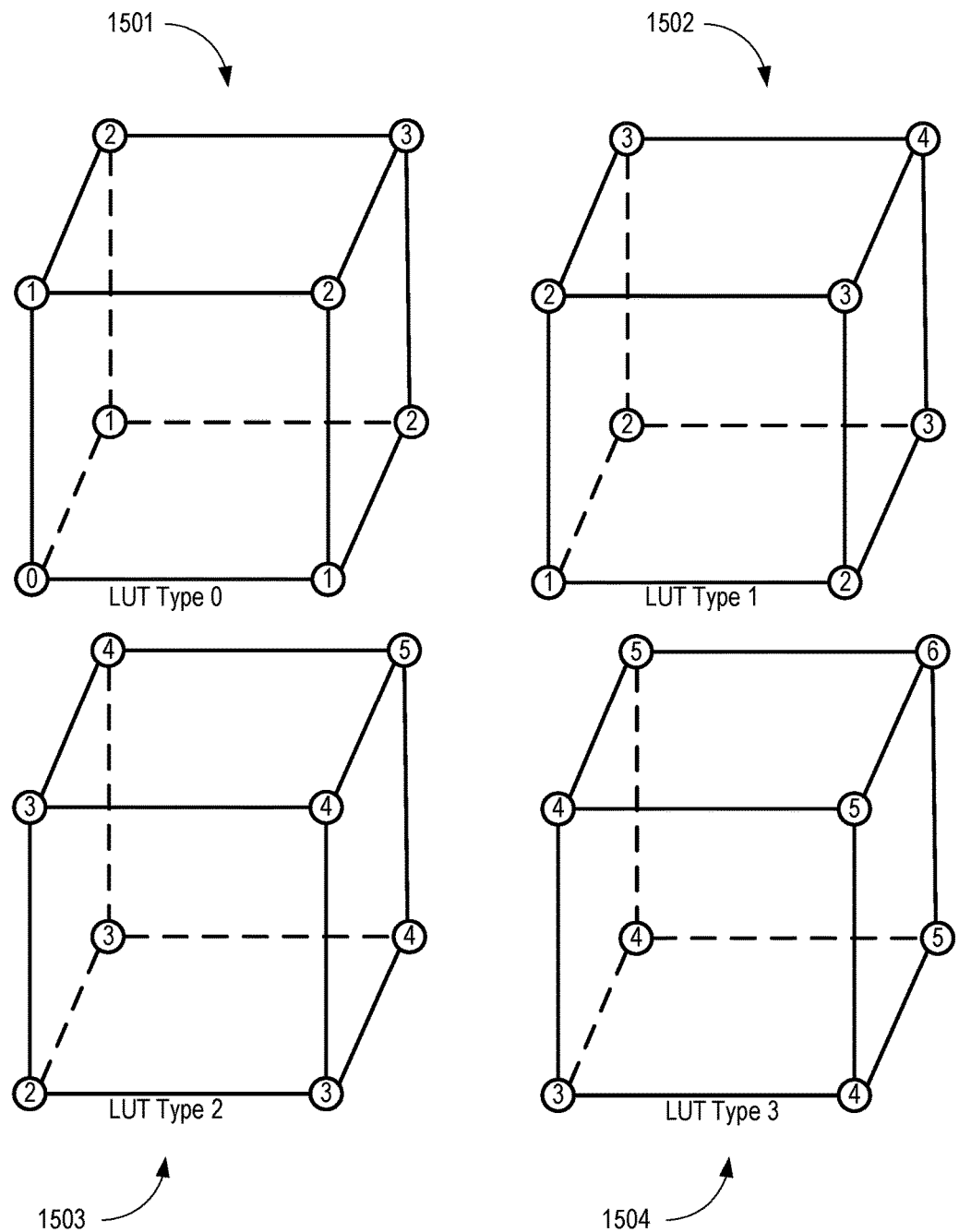
FIG. 15 is a diagram that illustrates a first portion of a second set of LUT types for a set of cubes in a lattice that represent the 3-D LUT in a high precision mode (mode 1) according to some embodiments.
Figure 16:
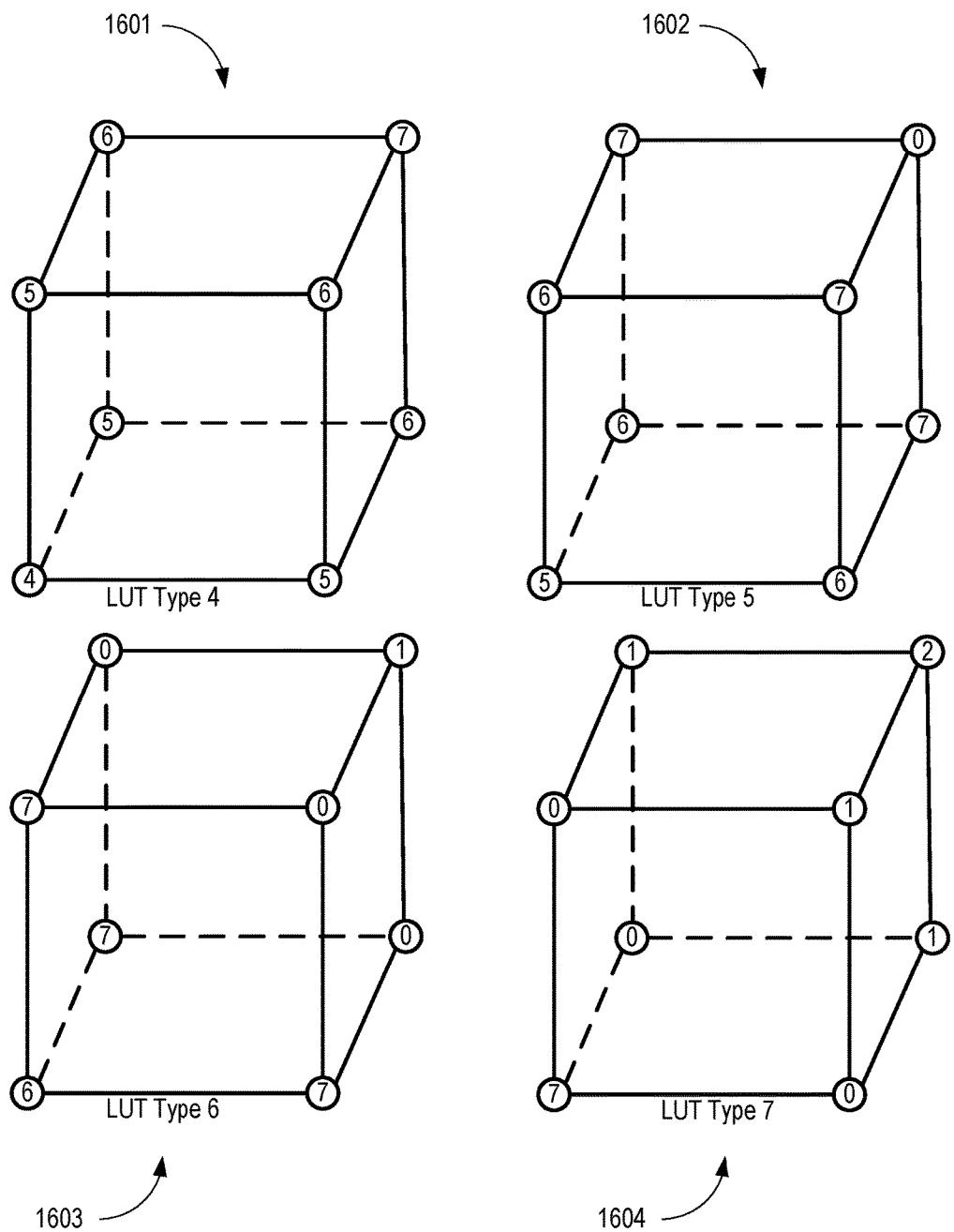
FIG. 16 is a diagram that illustrates a second portion of a second set of LUT types for a set of cubes in a lattice that represent the 3-D LUT in the high precision mode (mode 1) according to some embodiments.

The LUT type of the cube that encompasses the input color in the 3-D LUT is determined based on the memory elements that are used to store the component values associated with the vertices of the cube. The set of LUT types is mode dependent and therefore which set of LUT types is used depends upon the mode that has been determined by the mode selector. FIG. 14 is a diagram that illustrates a first set of LUT types for a set of cubes 1401, 1402, 1403, 1404 in a lattice that represents the 3-D LUT for a low precision mode (mode 0) according to some embodiments. FIG. 15 is a diagram that illustrates a first portion of a second set of LUT types for a set of cubes 1501, 1502, 1503, 1504 in a lattice that represent the 3-D LUT for a high precision mode (mode 1) according to some embodiments. FIG. 16 is a diagram that illustrates a second portion of the second set of LUT types for a set of cubes 1601, 1602, 1603, 1604 in a lattice that represent the 3-D LUT for the high precision mode (mode 1) according to some embodiments. The numbers (0, 1, 2, 3, 4, 5, 6, 7) in the circles at the vertices of the cubes in FIGS. 14-16 indicate the eight memory elements that are used to store component values and evaluate each of the vertices is stored in the memory element indicated by the corresponding number. For example, the number 0 indicates that the corresponding component value is stored in a first memory such as the memory 941 shown in FIG. 9, the number 1 indicates that the corresponding component value is stored in a second memory such as the memory 942 shown in FIG. 9, the number 2 indicates that the corresponding component value is stored in a third memory such as the memory 943 shown in FIG. 9, etc.

The different LUT types 0, 1, 2, 3, 4, 5, 6, 7 correspond to different associations of the vertices of the cubes 1401-1404, 1501-1504, and 1601-1604 to the eight memory elements 0, 1, 2, 3, 4, 5, 6, 7 that are available in modes 0 or 1. In some embodiments, the LUT type of the cubes 1401-1404 for mode 0 and the LUT type of the cubes 1501-1504 and 1601-1604 for mode 1 are determined from the RGB indices associated with the input color using:

lut_type=rem((B+G+R)/8), which is a remainder of (B+G+R) after division by 8. The LUT type of the cubes 1401-1404 for mode 0 is always an even number. The following table indicates the memory elements associated with each vertex in the cubes 1401-1404 for each LUT type in mode 0:

| lut_type | Mode 0 | | | | | | |
|---|---|---|---|---|---|---|---|
| | H | I | J | K | L | M | N | O |
| 0 | 0 | 2 | 4 | 2 | 2 | 4 | 6 | 4 |
| 1 | | | | | | | | |
| 2 | 2 | 4 | 6 | 4 | 4 | 6 | 0 | 6 |
| 3 | | | | | | | | |
| 4 | 4 | 6 | 0 | 6 | 6 | 0 | 2 | 0 |
| 5 | | | | | | | | |
| 6 | 6 | 0 | 2 | 0 | 0 | 2 | 4 | 2 |
| 7 | | | | | | | | |

The following table indicates the memory elements associated with each vertex in the cubes 1501-1504 and 1601-1604 for each LUT type in mode 1:

| lut_type | Mode 1 | | | | | | |
|---|---|---|---|---|---|---|---|
| | H | I | J | K | L | M | N | O |
| 0 | 0 | 1 | 2 | 1 | 1 | 2 | 3 | 2 |
| 1 | 1 | 2 | 3 | 2 | 2 | 3 | 4 | 3 |
| 2 | 2 | 3 | 4 | 3 | 3 | 4 | 5 | 4 |
| 3 | 3 | 4 | 5 | 4 | 4 | 5 | 6 | 5 |
| 4 | 4 | 5 | 6 | 5 | 5 | 6 | 7 | 6 |
| 5 | 5 | 6 | 7 | 6 | 6 | 7 | 0 | 7 |
| 6 | 6 | 7 | 0 | 7 | 7 | 0 | 1 | 0 |
| 7 | 7 | 0 | 1 | 0 | 0 | 1 | 2 | 1 |

At block 1210, a module such as the module 910 shown in FIG. 9 determines a type of the tetrahedron used for the interpolation and weights associated with the vertices of the tetrahedron. There are six types of tetrahedron corresponding to the six tetrahedrons 301-306 shown in FIG. 3. The module determines the type of the tetrahedron using the RGB offsets (r, g, b) of the input color:

T0: g>=b>r

T1: b>r>g

T2: b>g>=r

T3: r>=g>b

T4: g>r>=b

T5: r>=b>=g.

The weights ($w_A$, $w_B$, $w_C$, $w_D$) are determined based on the RGB offsets (r, g, b) of the input color and the length Δ of one side of the cube:

$\Delta = 2^{(n-m+1-mode)}$

In some embodiments, when mode-dependent offsets truncate the LSB in mode 0 or pad with zero in mode 1, the value Δ is updated accordingly. The details of the weights calculation should use the following table:

| tetrahedron | $w_A$ | $w_B$ | $w_C$ | $w_D$ |
|---|---|---|---|---|
| T0 | Δ-g | g-b | b-r | R |
| T1 | Δ-b | b-r | r-g | G |
| T2 | Δ-b | b-g | g-r | R |
| T3 | Δ-r | r-g | g-b | B |
| T4 | Δ-g | g-r | r-b | B |
| T5 | Δ-r | r-b | b-g | G |

At block 1215, a module such as the address switch 935 shown in FIG. 9 performs address switching to identify four vertices for the selected tetrahedron from the eight vertices of the cube based on the type of tetrahedron using the following table:

| tetrahedron | Addr_A | Addr_B | Addr_C | Addr_D |
|---|---|---|---|---|
| T0 | H | K | O | N |
| T1 | H | L | M | N |
| T2 | H | L | O | N |
| T3 | H | I | J | N |
| T4 | H | K | J | N |
| T5 | H | I | M | N |

In some embodiments, the multiplexer 717 selects from vertex K, I, or L and the multiplexer 718 selects from vertex M, O, or J. The addresses are then switched based on the operational mode of the 3-D LUT and the LUT type (lut_type) of the cube. The Addr0, Addr1, Addr2, Addr3, Addr4, Addr5, Addr6, and Addr7 are used to access LUT0, LUT1, LUT2, LUT3, LUT4, LUT5, LUT6, and LUT7, respectively. For example, the addresses can be switched using the following table for operational mode 0:

| | Mode 0 | | | | | | | |
|---|---|---|---|---|---|---|---|---|
| lut_type | Addr0 | Addr1 | Addr2 | Addr3 | Addr4 | Addr5 | Addr6 | Addr7 |
| 0 | Addr_A | | Addr_B | | Addr_C | | Addr_D | |
| 1 | | | | | | | | |
| 2 | Addr_D | | Addr_A | | Addr_B | | Addr_C | |
| 3 | | | | | | | | |
| 4 | Addr_C | | Addr_D | | Addr_A | | Addr_B | |
| 5 | | | | | | | | |
| 6 | Addr_B | | Addr_C | | Addr_D | | Addr_A | |
| 7 | | | | | | | | |

The blank cell means no memory access at this time. For another example, the addresses can be switched using the following table for operational mode 1:

| | Mode 1 | | | | | | | |
|---|---|---|---|---|---|---|---|---|
| lut_type | Addr0 | Addr1 | Addr2 | Addr3 | Addr4 | Addr5 | Addr6 | Addr7 |
| 0 | Addr_A | Addr_B | Addr_C | Addr_D | | | | |
| 1 | | Addr_A | Addr_B | Addr_C | Addr_D | | | |
| 2 | | | Addr_A | Addr_B | Addr_C | Addr_D | | |
| 3 | | | | Addr_A | Addr_B | Addr_C | Addr_D | |
| 4 | | | | | Addr_A | Addr_B | Addr_C | Addr_D |
| 5 | Addr_D | | | | | Addr_A | Addr_B | Addr_C |
| 6 | Addr_C | Addr_D | | | | | Addr_A | Addr_B |
| 7 | Addr_B | Addr_C | Addr_D | | | | | Addr_A |

At block 1220, the values of the component colors associated with the tetrahedron vertices are accessed concurrently from the set of memory elements using the addresses Addr0-Addr7 as listed in above two mode-dependent tables.

At block 1225, a module such as the data selector 960 shown in FIG. 9 selects data from the appropriate memory elements based on the LUT type, as indicated in the following table:

| | Mode 0 | | | | Mode 1 | | | |
|---|---|---|---|---|---|---|---|---|
| lut_type | $O_0$ | $O_1$ | $O_2$ | $O_3$ | $O_0$ | $O_1$ | $O_2$ | $O_3$ |
| 0 | LUT0 | LUT2 | LUT4 | LUT6 | LUT0 | LUT1 | LUT2 | LUT3 |
| 1 | | | | | LUT1 | LUT2 | LUT3 | LUT4 |
| 2 | LUT0 | LUT2 | LUT4 | LUT6 | LUT2 | LUT3 | LUT4 | LUT5 |
| 3 | | | | | LUT3 | LUT4 | LUT5 | LUT6 |
| 4 | LUT0 | LUT2 | LUT4 | LUT6 | LUT4 | LUT5 | LUT6 | LUT7 |
| 5 | | | | | LUT0 | LUT5 | LUT6 | LUT7 |
| 6 | LUT0 | LUT2 | LUT4 | LUT6 | LUT0 | LUT1 | LUT6 | LUT7 |
| 7 | | | | | LUT0 | LUT1 | LUT2 | LUT7 |

At block 1230, a module such as the weight switch 950 shown in FIG. 9 performs weight switching so that the weights match the switched addresses using the following table:

| Lut_type | Mode 0 | | | | Mode 1 | | | |
| --- | --- | --- | --- | --- | --- | --- | --- | --- |
| | w0 | w1 | w2 | w3 | w0 | w1 | w2 | w3 |
| 0 | $w_A$ | $w_B$ | $w_C$ | $w_D$ | $w_A$ | $w_B$ | $w_C$ | $w_D$ |
| 1 | | | | | $w_A$ | $w_B$ | $w_C$ | $w_D$ |
| 2 | $w_D$ | $w_A$ | $w_B$ | $w_C$ | $w_A$ | $w_B$ | $w_C$ | $w_D$ |
| 3 | | | | | $w_A$ | $w_B$ | $w_C$ | $w_D$ |
| 4 | $w_C$ | $w_D$ | $w_A$ | $w_B$ | $w_A$ | $w_B$ | $w_C$ | $w_D$ |
| 5 | | | | | $w_D$ | $w_A$ | $w_B$ | $w_C$ |
| 6 | $w_B$ | $w_C$ | $w_D$ | $w_A$ | $w_C$ | $w_D$ | $w_A$ | $w_B$ |
| 7 | | | | | $w_B$ | $w_C$ | $w_D$ | $w_A$ |

At block 1235, an interpolator such as the tetrahedral interpolator 955 shown in FIG. 9 uses the values of the component colors associated with the tetrahedron vertices to interpolate to the output values from a location of the input color in the 3-D LUT. For example, the mapping outputs $o_0$, $o_1$, $o_2$, $o_3$ for each of the four vertices can be interpolated to the location of the input color. Each mapping output includes three color components such as Red, Green, and Blue color components in the second gamut. The interpolation output is determined based on the component values and the weights according to:

$$\begin{cases} R_{out} = (w_0 \times o_{R0} + w_1 \times o_{R1} + w_2 \times o_{R2} + w_3 \times o_{R3})/\Delta \\ G_{out} = (w_0 \times o_{G0} + w_1 \times o_{G1} + w_2 \times o_{G2} + w_3 \times o_{G3})/\Delta \\ B_{out} = (w_0 \times o_{B0} + w_1 \times o_{B1} + w_2 \times o_{B2} + w_3 \times o_{B3})/\Delta \end{cases}$$

In some embodiments, the apparatus and techniques described above are implemented in a system comprising one or more integrated circuit (IC) devices (also referred to as integrated circuit packages or microchips), such as the gamut mapper and 3-D LUT described above with reference to FIGS. 1-15. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   storing color component values associated with a first subset of vertices of a three-dimensional (3-D) look up table (LUT) in a first subset of a plurality of memory elements, wherein the color component values are defined according to a destination gamut;

accessing the color component values from the first subset of the plurality of memory elements and interpolating to an output color component value in the destination gamut based on the color component values accessed from the first subset of the plurality of memory elements concurrently with storing color component values associated with a second subset of the vertices of the 3-D LUT in a second subset of the plurality of memory elements; and accessing the color component values from the first and second subsets of the plurality of memory elements in response to storing the color component values associated with the second subset of the vertices of the 3-D LUT in the second subset of the plurality of memory elements.

2. The method of claim 1, wherein accessing the color component values from the first subset of the plurality of memory elements comprises determining an address of a vertex in the first subset of vertices based on a first number of most significant bits (MSBs) of a fixed point representation of an input color component defined according to a source gamut.

3. The method of claim 2, wherein accessing the color component values from the first and second subsets of the plurality of memory elements comprises determining an address of a vertex in the first and second subsets of vertices based on a second number of MSBs of the fixed point representation of the input color component.

4. The method of claim 3, wherein the first subset of the vertices are addressed by m−1 MSBs of the fixed point representation of the input color component.

5. The method of claim 4, wherein the fixed point representation of the input color includes n bits, and further comprising:

determining a first offset value of the input color component using n−m+1 least significant bits (LSBs) prior to storing the color component values associated with the second subset of the vertices of the 3-D LUT in the second subset of the plurality of memory elements.

6. The method of claim 5, further comprising:

interpolating to an output color component value in the destination gamut based on the color component values accessed from the first subset of the plurality of memory elements and the first offset value.

7. The method of claim 6, wherein the first and second subsets of the vertices are addressed by m MSBs of the fixed point representation of the input color component subsequent to storing the color component values associated with the second subset of the vertices of the 3-D LUT in the second subset of the plurality of memory elements.

8. The method of claim 7, further comprising:

determining a second offset value of the input color component using n−m least significant bits (LSBs) subsequent to storing the color component values associated with the second subset of the vertices of the 3-D LUT in the second subset of the plurality of memory elements.

9. The method of claim 8, further comprising:

interpolating to the output color component value based on the color component values accessed from the first and second subsets of the plurality of memory elements and the second offset value.

10. An apparatus comprising:

a plurality of memory elements;

a processor configured to store color component values associated with a first subset of vertices of a three-dimensional (3-D) look up table (LUT) in a first subset of the plurality of memory elements, wherein the color component values are defined according to a destination gamut; and a gamut mapper configured to access the color component values from the first subset of the plurality of memory elements and interpolate to an output color component value in the destination gamut based on the color component values accessed from the first subset of the plurality of memory elements concurrently with the processor storing color component values associated with a second subset of the vertices of the 3-D LUT in a second subset of the plurality of memory elements, wherein the gamut mapper is configured to access the color component values from the first and second subsets of the plurality of memory elements in response to the processor storing the color component values associated with the second subset of the vertices of the 3-D LUT in the second subset of the plurality of memory elements.

11. The apparatus of claim 10, further comprising:

an address decoder configured to determine an address of a vertex in the first subset of vertices based on a first number of most significant bits (MSBs) of a fixed point representation of an input color component defined according to a source gamut.

12. The apparatus of claim 11, wherein the address decoder is configured to determine an address of a vertex in the first and second subsets of vertices based on a second number of MSBs of the fixed point representation of the input color component.

13. The apparatus of claim 12, wherein the first subset of the vertices are addressed by m−1 MSBs of the fixed point representation of the input color component.

14. The apparatus of claim 13, wherein the fixed point representation of the input color includes n bits, and further comprising:

a mode selector to determine a first offset value of the input color component using n−m+1 least significant bits (LSBs) prior to storing the color component values associated with the second subset of the vertices of the 3-D LUT in the second subset of the plurality of memory elements.

15. The apparatus of claim 14, further comprising:

an interpolator to interpolate to an output color component value in the destination gamut based on the color component values accessed from the first subset of the plurality of memory elements and the first offset value.

16. The apparatus of claim 15, wherein the first and second subsets of the vertices are addressed by m MSBs of the fixed point representation of the input color component subsequent to storing the color component values associated with the second subset of the vertices of the 3-D LUT in the second subset of the plurality of memory elements.

17. The apparatus of claim 16, wherein the mode selector is configured to determine a second offset value of the input color component using n−m least significant bits (LSBs) subsequent to storing the color component values associated with the second subset of the vertices of the 3-D LUT in the second subset of the plurality of memory elements.

18. The apparatus of claim 17, wherein the interpolator is configured to interpolate to the output color component value based on the color component values accessed from the first and second subsets of the plurality of memory elements and the second offset value.

19. A method comprising:
- in a first mode of operation, accessing color component values associated with a first subset of vertices of a three-dimensional (3-D) look up table (LUT) that were previously stored in a first subset of a plurality of memory elements and interpolating to an output color component value in a destination gamut based on the color component values accessed from the first subset of the plurality of memory elements concurrently with storing color component values associated with a second subset of the vertices of the 3-D LUT in a second subset of the plurality of memory elements, wherein the color component values are defined according to the destination gamut; and
- in a second mode of operation, accessing the color component values from the first and second subsets of the plurality of memory elements.

20. The method of claim 19, wherein an address of a vertex in the first subset of vertices is determined, in the first mode of operation, based on a first number of most significant bits (MSBs) of a fixed point representation of an input color component defined according to a source gamut, and wherein an address of a vertex in the first and second subsets of vertices is determined, and the second mode of operation, based on a second number of MSBs of the fixed point representation of the input color component.

* * * * *